(12) United States Patent
Boshev et al.

(10) Patent No.: US 11,907,364 B2
(45) Date of Patent: Feb. 20, 2024

(54) MANAGING INCOMPLIANCES IDENTIFIED AT INSTANCES OF CLOUD APPLICATIONS

(71) Applicant: SAP SE, Walldorf (DE)

(72) Inventors: Stoyan Zhivkov Boshev, Sofia (BG); Iliyan Nedkov Mihaylov, Stara Zagora (BG); Stoyan Ivanov Veleshki, Sofia (BG); Rashid Methinov Rashidov, Sofia (BG); Nikolay Georgiev Kabadzhov, Sofia (BG); Diyan Asparuhov Yordanov, Sofia (BG)

(73) Assignee: SAP SE, Walldorf (DE)

( * ) Notice: Subject to any disclaimer, the term of this patent is extended or adjusted under 35 U.S.C. 154(b) by 443 days.

(21) Appl. No.: 17/336,700

(22) Filed: Jun. 2, 2021

(65) Prior Publication Data

US 2022/0391495 A1     Dec. 8, 2022

(51) Int. Cl.
| | | |
|---|---|---|
| G06F 21/57 | (2013.01) | |
| G06F 21/52 | (2013.01) | |
| G06F 21/54 | (2013.01) | |
| G06F 9/50 | (2006.01) | |
| G06F 21/71 | (2013.01) | |
| G06F 9/48 | (2006.01) | |

(52) U.S. Cl.
CPC ........... *G06F 21/54* (2013.01); *G06F 9/4881* (2013.01); *G06F 9/5072* (2013.01); *G06F 21/577* (2013.01); *G06F 21/71* (2013.01)

(58) Field of Classification Search
CPC ...... G06F 21/54; G06F 9/4881; G06F 9/5072; G06F 21/577; G06F 21/71; G06F 21/57; G06F 21/52
See application file for complete search history.

(56) References Cited

U.S. PATENT DOCUMENTS

| 8,019,860 B2 | 9/2011 | Ivanov et al. |
| 8,078,922 B2 | 12/2011 | Yordanov et al. |
| 8,261,272 B2 | 9/2012 | Yordanov |
| (Continued) | | |

OTHER PUBLICATIONS

U.S. Appl. No. 17/067,223, Boshev, filed Oct. 9, 2020.
(Continued)

*Primary Examiner* — Joseph P Hirl
*Assistant Examiner* — Aayush Aryal
(74) *Attorney, Agent, or Firm* — Fish & Richardson P.C.

(57) ABSTRACT

The present disclosure relates to computer-implemented methods, software, and systems for managing incompliances of application instances running in a cloud environment. Compliance requests can be generated for incompliant instances of cloud applications running on a cloud platform. In response, compliance checks for the one or more incompliant instances of cloud applications running on the cloud platform can be automatically executed. Incompliances can be identified by different compliance monitors instantiated at the cloud platform. Each compliance monitor is responsible for a particular type of incompliances. In response to identifying that a first instance of a first cloud application has a first type of incompliance, a maintenance action to be automatically executed by a first compliance maintainer running on the cloud platform is scheduled. The first compliance maintainer executes automatically a compliance measurement action for the first type of incompliance.

20 Claims, 9 Drawing Sheets

(56) References Cited

U.S. PATENT DOCUMENTS

| | | | |
|---|---|---|---|
| 8,527,992 | B2 | 9/2013 | Dokovski et al. |
| 8,782,676 | B2 | 7/2014 | Dokovski et al. |
| 8,898,220 | B2 | 11/2014 | Grigorov et al. |
| 9,274,783 | B2 | 3/2016 | Valkov et al. |
| 9,432,398 | B2 | 8/2016 | Iliev et al. |
| 9,471,336 | B2 | 10/2016 | Neichev et al. |
| 9,503,447 | B2 | 11/2016 | Manolov et al. |
| 9,602,521 | B2 | 3/2017 | Iliev et al. |
| 9,614,730 | B2 | 4/2017 | Boshev et al. |
| 9,665,416 | B1 | 5/2017 | Boshev et al. |
| 9,826,035 | B2 | 11/2017 | Genevski et al. |
| 10,067,808 | B2 | 9/2018 | Boshev et al. |
| 10,084,839 | B2 | 9/2018 | Boshev et al. |
| 10,191,818 | B2 | 1/2019 | Boshev et al. |
| 10,198,330 | B2 | 2/2019 | Boshev et al. |
| 10,261,872 | B2 | 4/2019 | Boshev et al. |
| 10,275,346 | B2 | 4/2019 | Boshev et al. |
| 10,514,905 | B1* | 12/2019 | Montgomery .......... G06F 21/54 |
| 10,528,624 | B2 | 1/2020 | Boshev |
| 10,747,730 | B2 | 8/2020 | Dimitrov et al. |
| 10,810,055 | B1* | 10/2020 | Walker ................ G06F 16/2358 |
| 10,824,461 | B2 | 11/2020 | Sabev et al. |
| 10,826,965 | B2 | 11/2020 | Boshev |
| 10,872,029 | B1* | 12/2020 | Bawcom ............. G06F 21/6218 |
| 11,416,874 | B1* | 8/2022 | Scotney ................. H04L 63/10 |
| 2013/0160132 | A1 | 6/2013 | Genova et al. |
| 2014/0025439 | A1 | 1/2014 | Kabadzhov et al. |
| 2017/0142157 | A1* | 5/2017 | Cao ..................... H04L 63/1433 |
| 2019/0073600 | A1 | 3/2019 | Boshev et al. |
| 2019/0332494 | A1* | 10/2019 | Natanzon ............ G06F 11/1448 |
| 2020/0310928 | A1 | 10/2020 | Neichev et al. |

OTHER PUBLICATIONS

U.S. Appl. No. 17/068,245, Boshev, filed Oct. 12, 2020.
U.S. Appl. No. 17/098,618, Boshev et al., filed Nov. 16, 2020.
U.S. Appl. No. 17/169,754, Yousouf et al., filed Feb. 8, 2021.
U.S. Appl. No. 17/169,787, Yousouf et al., filed Feb. 8, 2021.
U.S. Appl. No. 17/170,105, Yousouf et al., filed Feb. 8, 2021.
U.S. Appl. No. 17/170,166, Yousouf et al., filed Feb. 8, 2021.
U.S. Appl. No. 17/208,496, Boshev et al., filed Mar. 22, 2021.
U.S. Appl. No. 17/208,558, Boshev et al., filed Mar. 22, 2021.
Alibabacloud.com [online], "Vulnerabilities" Mar. 2021, [retrieved on Jun. 2, 2021], retrieved from: URL <https://www.alibabacloud.com/help/doc-detail/142154.htm?spm=a2c63.p38356.b99.73.37722316TqYqYJ>, 5 pages.
Docs.microsoft.com [online], "Configure actions for noncompliant devices in Intune" Apr. 2021, [retrieved on Jun. 2, 2021], retrieved from: URL <https://docs.microsoft.com/en-us/mem/intune/protect/actions-for-noncompliance>, 11 pages.

* cited by examiner

MANAGING INCOMPLIANCES IDENTIFIED AT INSTANCES OF CLOUD APPLICATIONS

TECHNICAL FIELD

The present disclosure relates to computer-implemented methods, software, and systems for data processing in a cloud environment.

BACKGROUND

Software complexity is increasing and causes changes to lifecycle management and maintenance of software applications and platform systems. Customer's needs are transforming, with increased requests for flexibility in terms of processes and landscapes, and also for high availability to access resources provided by cloud applications. Cloud platforms are used by customers to deploy their applications in a highly available mode where customer's applications are executed according to defined rules for execution defined by platform providers.

SUMMARY

The present disclosure involves systems, software, and computer implemented methods for managing incompliances of application instances running in a cloud environment.

One example method may include operations such as: in response to generating compliance requests for one or more incompliant instances of one or more cloud applications, automatically executing compliance checks for the one or more incompliant instances of cloud applications running on the cloud platform, wherein the one or more incompliant instances are associated with one or more incompliances identified at the one or more incompliant instances, wherein the incompliances are identified by different compliance monitors from a plurality of compliance monitors instantiated at the cloud platform, and wherein each compliance monitor is responsible for a particular type of incompliances; in response to identifying that a first instance of a first cloud application has a first type of incompliance after executing a corresponding compliance check, scheduling a maintenance action to be automatically executed by a first compliance maintainer running on the cloud platform, wherein the first compliance maintainer is configured to execute compliance measurement actions for the first type of incompliance identified at the first instance of the first cloud application; and automatically executing, by the first compliance maintainer, the maintenance action at the first instance of the first cloud application.

Implementations can optionally include one or more of the following features. In some instances, an incompliance that is associated with the first instance of the first cloud application is an incompliance of a runtime environment used for executing the first instance of the first cloud application, wherein the runtime environment used for executing the first instance differs from one or more compliant versions of a runtime environment that is to be used by cloud applications running on the cloud platform.

In some instances, implementations can optionally include retrieving current metadata for the first instance of the first cloud application from the first instance of the first cloud application; retrieving latest metadata for the first cloud application, wherein the latest metadata includes latest deployment configuration data used for deploying a latest instance of the first cloud application; in response to identifying that the compliance measurement action is not executed for the first instance of the first cloud application, determining metadata for starting a new instance of the first cloud application based on evaluating the current metadata and the latest metadata according to evaluation rules including rules associated with technical and compatibility requirements of the first cloud application; starting the new instance of the first cloud application; and deprecating and stopping the first instance of the first cloud application.

In some instances, a plurality of instances of cloud applications on the cloud platform can be audited based on corresponding configured rules defined for the cloud applications. The auditing can be done by at least some of the plurality of compliance monitors, based on corresponding configured rules defined for the cloud applications.

In some instances, in response to the auditing, the first compliance request associated with a first incompliance identified at the first instance of the first cloud application can be created by a first compliance monitor of the plurality of compliance monitors. The first compliance monitor can be responsible for identifying the first type of incompliances at the cloud applications, wherein the first compliance request includes a first time period defined for awaiting of execution of compliance measurements to remedy the first incompliance. A second compliance request associated with a second incompliance identified at the first instance of the first cloud application can be created by a second compliance monitor of the plurality of compliance monitors. The second compliance monitor can be responsible for identifying a second type of incompliances at the cloud applications. The second compliance request includes a second time period defined for awaiting of execution of compliance measurements to remedy the second incompliance. In some instances, the first compliance monitor and the second compliance monitor can store the first compliance request and the second compliance request at a persistence storage. In some instances, in response to creating and storing the first and the second compliance requests, a first notification for the first instance of the first cloud application and a second notification for the first instance of the first cloud application can be crated. The first notification is to be sent over a first communication channel of a plurality of communication channels to a contact entity defined for the first instance of the first cloud application. The second notification is to be sent over the first communication channel of a plurality of communication channels to the contact entity defined for the first instance of the first cloud application.

In some instances, each compliance monitor of the plurality of compliance monitors is responsible for identifying a different type of incompliance of a cloud application. One instance of a cloud application can be associated with one or more different types of incompliance.

In some instances, the plurality of communication channels include e-mail communication, instant messaging, voice message communication, direct phone communication, and application-to-application communication.

In some instances, each compliance monitor of the plurality of compliance monitors maintains rules for evaluating status of instances of cloud applications running on the cloud platform, wherein rules maintained by each compliance monitor correspond to each type of incompliance for which the compliance monitor is responsible.

In some instances, auditing the plurality of instances of cloud applications further includes: performing compliance verification by evaluating runtime configurations of runtime environments where instances of an application is running, wherein the compliance verification comprises: performing security checks associated with an instance of an application; and identifying a security incompliance associated with a runtime environment for executing the instance of the application.

In some instances, the first notification includes data describing the first incompliance identified at the first instance of the first cloud application.

In some instances, the first notification and the second notification can be provided to the contact entity defined for the first instance by a notification component of a plurality of notification components, wherein the notification component corresponds to the first communication channel.

In some instances, the first notification is provided to one or more entities defined for the first instance of the first cloud application by a corresponding one or more notification components, wherein a notification component corresponds to a type of communication channel, In some instances, one notification component can handle generation and providing of notifications associated with multiple instances associated with one or more cloud applications running on the cloud platform.

Other implementations of this aspect include corresponding systems, apparatus, and computer programs, configured to perform the actions of the methods, encoded on computer storage devices.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
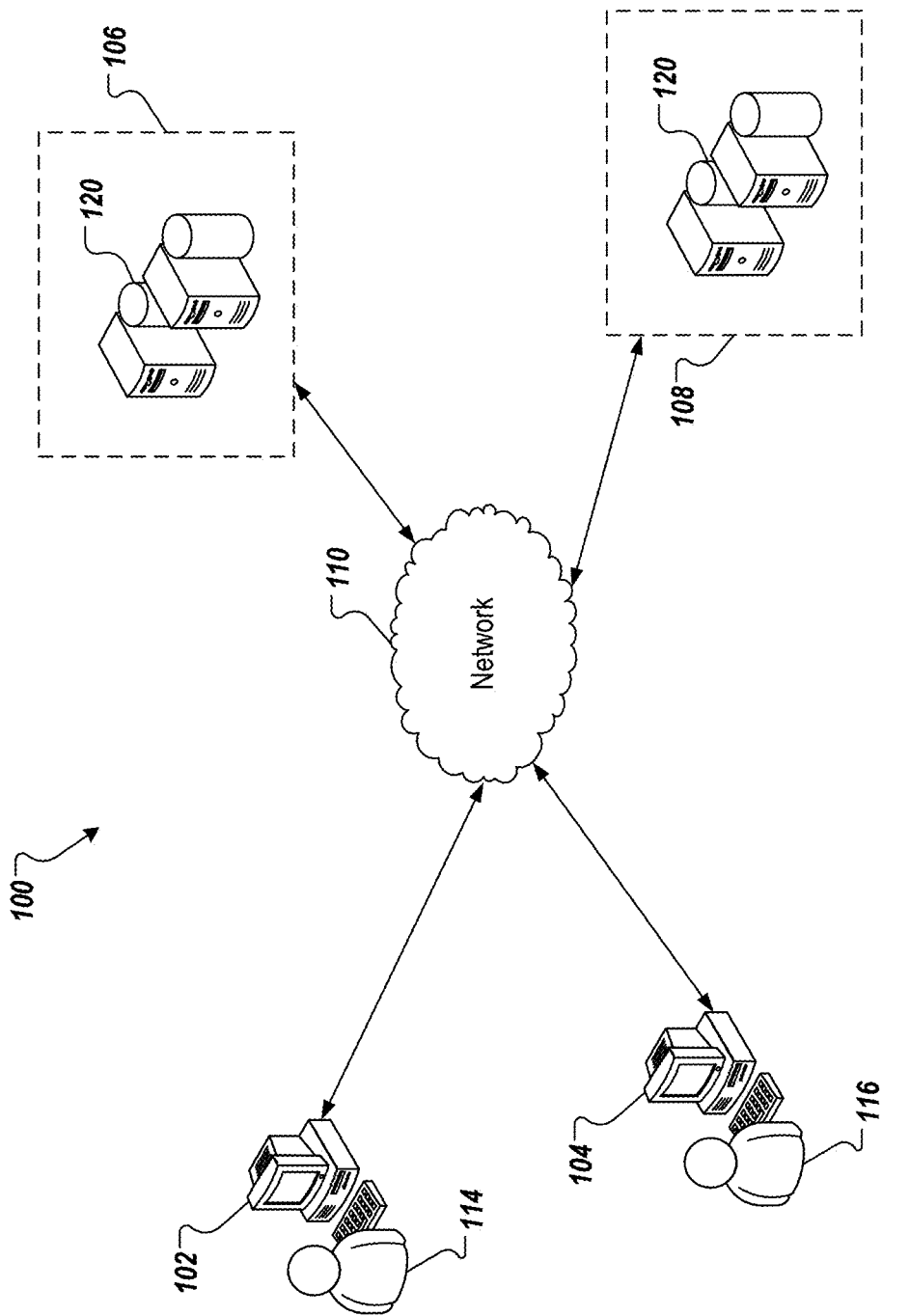
FIG. 1 illustrates an example computer system architecture that can be used to execute implementations of the present disclosure.

The present disclosure describes various tools and techniques for managing incompliances of application instances running in a cloud environment.

In some instances, cloud platforms aim to maintain a high availability solution that can scale to provide services corresponding to customers' demands. Configuring a cloud platform with multiple application instance deployments may be associated with a complex setup and maintenance activities. In some instances, applications running on the cloud platform have to be regularly updated or upgraded to comply with different policies. In some of those instances, the updates and upgrades can be performed as part of the lifecycle of the application and based on service requirements defined for the applications by themselves. In some other instances, the applications have to be maintained to comply with different types of requirements defined for the cloud platform (e.g., from a platform provider). Such requirements defined for the cloud platform can be applicable for all of the application, or can be defined for different sets of (or single) applications (e.g., based on used technology for developing, building and running the applications). In some instances, maintenance of applications can be a responsibility of the entities who own the applications (e.g., customers of the cloud platform), can be handled by other parties including the platform provider on behalf of the customers, can be a responsibility of the cloud platform provider, a combination thereof, or an alternative. In some instances, some customers may start their applications and execute them (have them in a running state) leave them running for a very long period of time (e.g., over a predetermined period of time, such as a number of days, months, or else) without updating and/or restarting the application. In some cases, when an application is not restarted, an update cannot be triggered for the application, and if an update is not requested actively, the application can be associated with incompliances with the cloud platform requirements. For example, the application can be running on an incompliant operating system (OS) and/or on an incompliant version/type of a runtime environment. Cloud applications may be deployed as multiple instance application. Therefore, such incompliances may be associated with one or more of the instances of a cloud application. Therefore, maintenance activities performed for a cloud application can be associated with activities performed for each of the application instances.

In some instances, a cloud platform can be monitored for compliance of the deployed and running application instances. For example, a cloud provider can periodically perform compliance verification activities to evaluate configurations of running applications. In some instances, the compliance verification activities can be performed based on predefined rules that can be associated with policies defined for applications running on the cloud platform. The policies can be associated with security requirements, software requirements, asset configuration requirements, version compliance, technology specification requirements, or combination thereof. In some instances, the compliance verification activities can be executed to determine whether there are security vulnerabilities at one or more of the running instances of cloud application. In cases where such vulnerabilities are identified, follow-up updated may be recommended or otherwise executed for the identified application instances.

In some instances, some application instances are running and provide services (e.g., for end users or to other applications and/or services) without interruptions. In some of those instances, this may mean that some application instances are not restarted and/or updated for a substantially long period of time. In some instances, software fixes and/or patches can be distributed to running application instances for the application instances to be updated. Those software fixes and/or patches can be distributed by the cloud provider based on evaluation of states and configuration parameters of the running application instances.

In some instances, a cloud platform may configure compliance rules for application instances. For example, the cloud platform may require that each application instance is compliant with executing all relevant security updated that were provided to those instances. In some examples, all application instances can receive the same security updates. In some other examples, the updates that are received by the application instances are defined based on the technology, state, and specifics of each of the instances. In some instances, the cloud platform may define compliance actions to be executed by instances on the cloud platform.

In some instances, notifications for various compliance actions may be provided in different forms, and some or all may be accompanied by a description for execution. For example, a compliance action may be provided as a notification message within the application instance that can be processed at the instance (e.g., by a user such as an administrator).

In some instances, when a compliance action (e.g., a fix, a patch, or an update) is distributed to an application instance, that compliance action has to be executed (or installed) on the application instance. Thus, in those cases, a restart of the application instance may be required. In other cases, if the application instance is restarted (without a particular reason and without an external trigger based on an identified compliance action), the restart can trigger an execution of the compliance action. However, if an application is not restarted and a compliance action is not executed, even though it is distributed, the application instance would not be maintained in a complaint state.

For example, a notification can be sent to an application instance that is identified as relevant to receive a compliance action, where the notification may identify that the application must be restarted for the compliance action to be automatically triggered for execution. In other cases, the notification can be sent to another application or a service that is associated with a customer who owns (or manages) the application. In some more examples, a notification can be sent to a contact entity that is configured or designated for the application that an application instance belongs to. The notification can be sent over e-mail, telephone consultation, instant messaging, voice messaging, direct phone communication, application-to-application communication, and other suitable communication channels, and can ask or suggest the contact entity to initiate a particular compliance action, or notify them that the action will be taken automatically after a certain time or event.

In some instances, an application instance may be considered at-risk (e.g., security vulnerability) if the application instance is identified as incompliant based on a compliance verification evaluation performed on the cloud platform, and/or if a determination is made that the application instance has not been updated or otherwise maintained to provide the application instance in a compliant state after an initial (or several primary) evaluations. In some instances, if an application instance has not been restarted for a long period of time, and a compliance action has not been executed on the application instance even when such an action is identified as relevant for the application instance, then the application instance will be considered as running as incompliant. Having an incompliant application instance may have an impact on the security level of the entire cloud platform. For example, if an application instance is running on a runtime environment that is identified as obsolete and incompliant with the configured rules at the cloud platform, and if the application instance is not restarted or updated to perform an action to update the runtime environment (e.g., to change the environment's version where the update fixes a particular vulnerability), then the application instance is not compliant and can put the whole or part of the cloud platform at risk.

In some instances, to maintain application instances of executed applications on a cloud platform in compliance with rules and prerequisites for compliance defined by the cloud platform, maintenance services can be provided. In some instances, these maintenance services can include services performing an automatic procedure for detecting incompliances (e.g., security incompliances) at the application instances on the cloud platform, services providing notifications for the affected instances to contact entities defined for the entity owning the application (e.g., a customer of the cloud platform who owns the affected instance), and services to automatically execute maintenance actions where incompliances are not addressed.

In some instances, when incompliances are detected, notifications can be sent to customers over different communication channels. Those notifications can define a time period for executing a maintenance activity to bring the instance into a compliance state, for example, to execute an update, to restart the application instance, or to run a script, among other suitable actions that can address incompliances of different time. If the customer does not react within the predefined time period, the cloud platform may act to perform those actions automatically. In some instances, the cloud platform can perform required actions for an application instance in a way that supports zero (or substantially close to zero) downtime for the application to which the application instance belongs. For example, if the application is running as a single instance application, a new instance can be started. When that instance starts successfully, the old instance can be terminated. In some instances, different maintenance and support actions can be performed depending on the incompliance(s) identified at an application instance. Further, and for example, maintenance actions can depend on software considerations associated with a type of the runtime environment for executing an identified instance as incompliant. For example, a maintenance action that can be taken can be to restart or to reboot the application instance.

In some instances, an application instance can be evaluated for incompliances based on different rules that can be correspondingly associated with different types of incompliances. There can be different types of incompliances, and the incompliances can be monitored by real-time monitors that are configured to evaluate states of application instances with respect to a particular type (or a set of types) of incompliance. If incompliances are not addressed after a notification has been already sent and a time period for awaiting an action has expired, then needed compliance actions can be automatically executed based on automatic maintenance procedures that can be implemented at the cloud platform.

FIG. 1 depicts an example architecture 100 in accordance with implementations of the present disclosure. In the depicted example, the example architecture 100 includes a client device 102, a client device 104, a network 110, and a cloud environment 106 and a cloud environment 108. The cloud environment 106 may include one or more server devices and databases (e.g., processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the cloud environment 106 include at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, the cloud environment 106 can host applications and databases running on host infrastructure. In some instances, the cloud environment 106 can include multiple cluster nodes that can represent physical or virtual machines. A hosted application and/or service can run on virtual machines (VMs) hosted on cloud infrastructure. In some instances, one application and/or service can run as multiple application instances on multiple corresponding VMs, where each instance is running on a corresponding VM.

In some instances, the cloud environment 106 and/or the cloud environment 108 can be configured in a multiple availability zone architecture, where the cloud environments can correspond to data centers that are connected with a highly available network and provide high speed of communication and high network bandwidth for data exchange. The cloud platform may receive requests for running applications, services, and/or databases that can run on cloud environment 106 and/or cloud environment 108. These applications, services, and databases may be designed, developed, executed, and maintained in relation to different customers and based on configured accounts that define process execution for the applications, the services, and the database.

In some instances, to maintain application instances of executed applications on the cloud platforms (106 and/or 108) in compliance with rules and prerequisites for compliance defined by the cloud platforms, maintenance framework can be provided. In some instances, these maintenance frameworks can include different components and configurations that can automatically monitor, evaluate, and perform execution steps related to incompliances of different type that can be identified at the application instances on the cloud platform.

Figure 2:
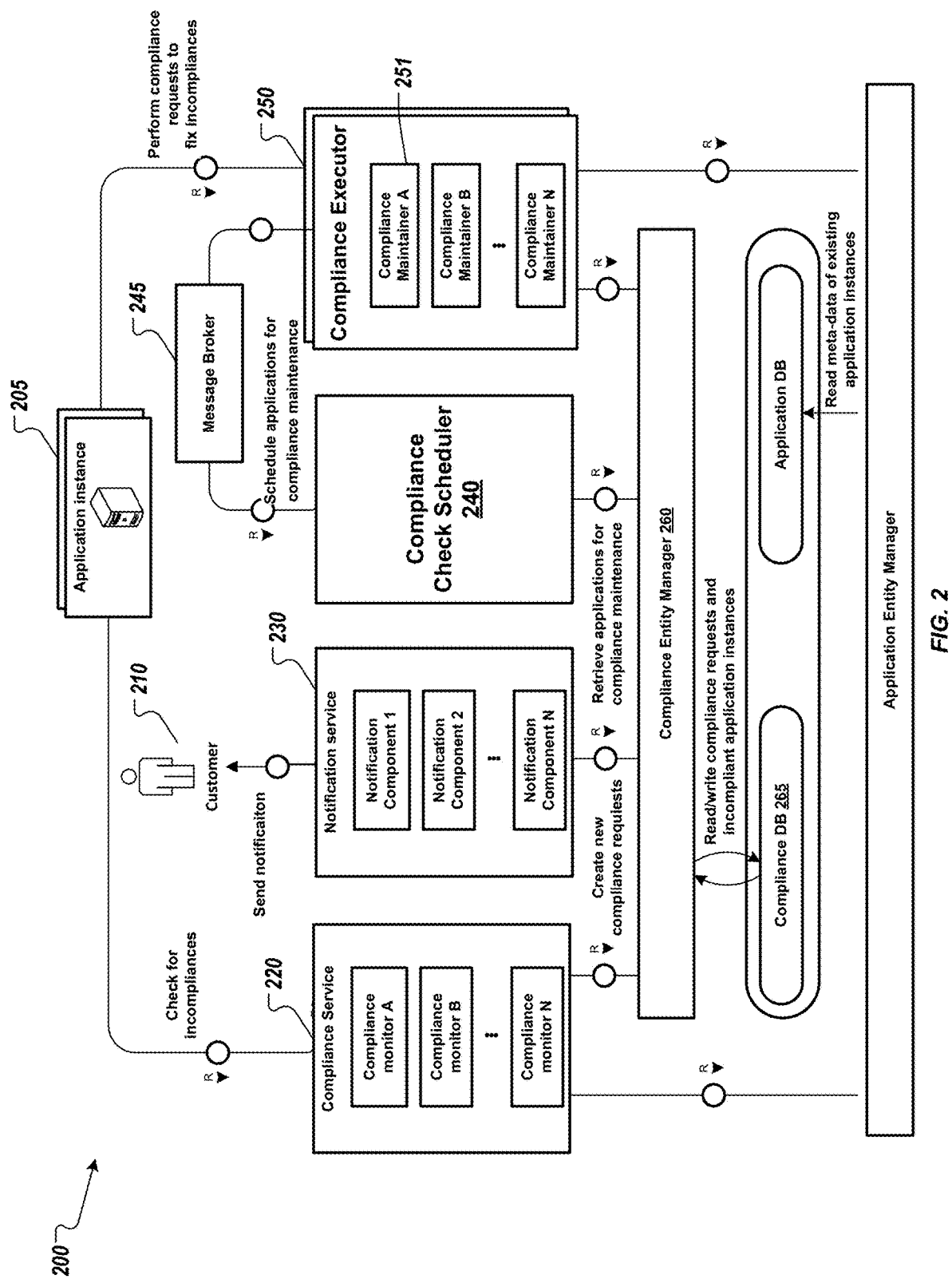
FIG. 2 is a block diagram for an example cloud platform including compliance management services for managing incompliances identified at application instances running on a cloud platform in accordance with implementations of the present disclosure.

FIG. 2 is a block diagram for an example cloud platform 200 including compliance management services for managing incompliances identified at application instances running on a cloud platform in accordance with implementations of the present disclosure.

In some instances, the cloud platform 200 can correspond to the cloud environment 106 and/or the cloud environment 108 of FIG. 1.

The cloud platform 200 can provide services and resources to a customer to develop, build, deploy, execute, manage, and maintain cloud applications. In some instances, the cloud applications can be executed as single instance applications or multiple instance applications. The cloud platform 200 can further define rules for compliance of applications (and their respective application instances) for running on the cloud platform. Those rules can be associated with different considerations, including asset configurations, security requirements, identity requirements, performance requirements, and connectivity requirements, among other examples of compliance rules that can be defined on a cloud platform for executing or new customer applications.

In some instances, the cloud platform 200 is provided with a compliance service 220 that includes multiple compliance monitors, where each compliance monitor is associated with different types of incompliances that can be identified at application instances 205 running on the cloud platform 200. In some instances, each of the compliance monitors can be configured to monitor the application instances 205, and can evaluate the application instances' states based on a particular type (or a set of types) of incompliances. In some instances, the compliance monitors can independently monitor different incompliances based on pre-defined rules. As the monitors are defined as separate modules, they support flexibility in managing the rules for identifying incompliances. For example, when rules for a particular incompliance has to be updated, the update can be relevant for only a single monitor. In another example, if further types of incompliances are requested to be evaluated, those can be addressed by additional monitors that can be plugged into the compliance service 220. In some instances, a single module may be associated with a plurality of monitors, such that a single module or component manages each of (or a subset of) the monitors.

In some instances, the compliance monitors at the compliance service 220 perform a determination of incompliances of the application instances 205, and, when an incompliance is identified at a first application instance, a new compliance request can be created and stored at a compliance entity manager 260. In some instances, one application instance can be identified to be incompliant with respect to multiple types of incompliances. Thus, multiple compliance requests for the different types of incompliances can be created and stored at the compliance entity manager 260.

In some instances, based on the stored compliance requests at the compliance entity manager 260, notifications can be generated and sent by a notification service 230. The notification service 230 may include multiple notification components, where different components may be each associated with a different communication channel. For example, applications running on the cloud platform 200 may be associated with a predefined communication channel for providing information and/or other data to the cloud platform 200 (e.g., a cloud platform's administrator or manager). In some cases, the communication that can be established between the notification service and a relevant entity to receive the notification can be implemented in an automated manner without requiring manual interaction. In some other cases, the notification service 230 may use contact information defined for applications to determine a suitable communication channel to use for sending the notification. For example, if an e-mail address is provided as contact information, then an e-mail service channel can be used to send the notification over an e-mail. In yet another example, if a phone number is provided as contact information, multiple communication channels may be suitable for the exchange of notifications, such as a direct phone call, an instance messaging service, a video messaging service, or some other suitable channel. In some instances, based on metadata stored for a given application and customer, a particular type of a channel and/or a type of a service can be selected as a channel for notification.

In some instances, the notification can describe the incompliance and requests a customer 210 to perform corresponding compliance maintenance actions within a predefined time period. Once the notification is sent, the compliance request can be marked as notified in a compliance database (DB) 265.

In some instances, the compliance entity manager 260 is configured to read and write compliance requests in the compliance DB 265. The compliance requests can be created by compliance monitor components of the compliance service 220. A single compliance monitor can be responsible to determine incompliances in the application instances 205 running on the cloud platform 200, and to create compliance request of a particular type. The compliance monitors can perform auditing of the application instances 205 to create the compliance requests and store them in a persistence storage, such as the compliance DB 265. In some instances, the compliance monitors can execute auditing in a regular manner (e.g., daily, within predefined time intervals, other) for all running customer application instances.

In some instances, customers associated with the application instances can be notified for incompliances once compliance requests are created.

In some instances, if a maintenance actions is not performed at an application instance that has already been notified with a created compliance request within the predefined time period, the cloud platform 200 can execute automatic actions to address the incompliance. The cloud platform 200 can have or implement a configured procedure at a compliance check scheduler 240 to execute evaluations (or checks) to determine whether a previously-notified application instance has executed the prescribed actions to address the incompliance and be placed in a compliant state. The compliance check scheduler 240 can retrieve information for created and previously-notified compliance requests from the compliance DB 265 via interactions and requests with the compliance entity manager 260. In some instances, if a compliance action is not executed for a notified application instance, the compliance check schedule 240 can schedule a maintenance action to be automatically executed by a compliance maintainer running on the cloud platform. The compliance maintainer can be a maintainer provided as part of a compliance executor 250 that is configured to execute compliance maintenance actions at particular application instances on the cloud platform 200. The compliance executor 250 includes multiple compliance maintainers, where each maintainer may be associated with a type of incompliance, similar to the considerations of handling different types of incompliances by different monitors at the compliance service 200. Thus, a compliance maintainer may handle executions of maintenance actions associated with a particular type(s) of incompliance(s). For example, a compliance maintainer 251 may be determined for the automatic execution of a scheduled maintenance action, where the determination can be based on the type of incompliance that is addressed. In some instances, the different maintainers can be responsible for executing maintenance actions associated with disparate and non-overlapping types of incompliances.

In some instances, the compliance check scheduler 240 schedules checks (or evaluations) for already-notified application instances through a message broker 245, where messages for an application instance(s) that has to be automatically maintained by the cloud platform 200 are published. The scheduled messages (requests) at the message broker 245 can be read one-by-one and can be executed by a particular compliance maintainer from the plurality of maintainers at the compliance executor 250. The different compliance maintainers can be provided with profiles identifying a corresponding type of incompliance that they are configured to process, and can execute maintenance actions to fix the identified incompliance type. The particular compliance maintainer is determined based on a match between the type of incompliance that is identified in the application instance and a profile of the compliance maintainer. In some instances, each compliance maintainer can include implemented logic on how to fix an incompliance corresponding to a particular incompliance type. The selection of the suitable compliance maintainer for a scheduled message can be performed by the compliance executor 250. The compliance maintainer can perform maintenance actions according to the compliance request to fix the incompliances on affected application instances. In some instances, a customer (or other entity) associated with the affected instances can be notified after a maintenance action is performed to fix an incompliance. In some instances, that notification can be performed automatically through the notification service 230 over a notification channel suitable for notifying the customer (or other entity) associated with the application instance.

Figure 3:
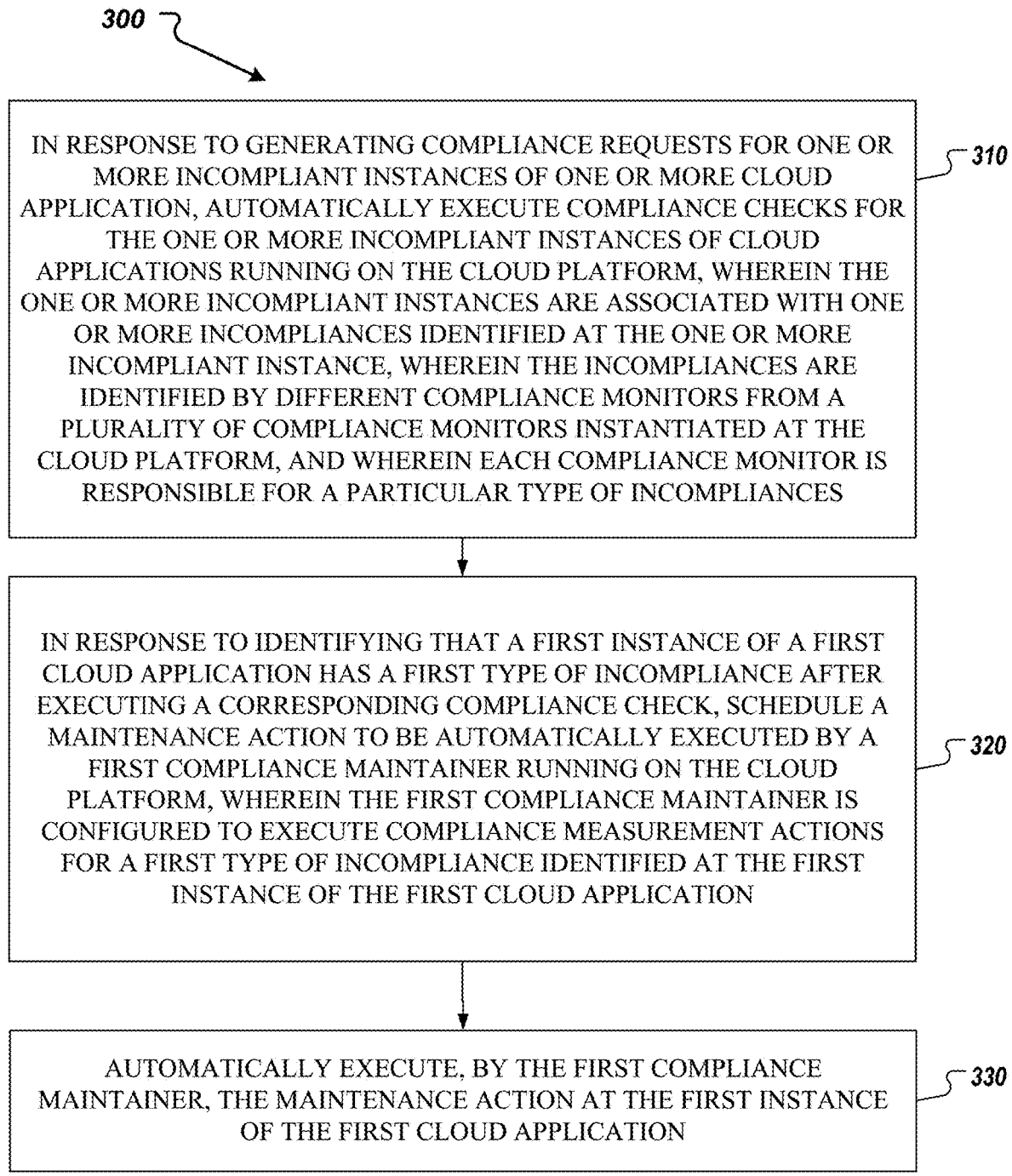
FIG. 3 is a flowchart for an example method for managing incompliances of application instances running on a cloud platform in accordance with implementations of the present disclosure.

FIG. 3 is a flowchart for an example method 300 for managing incompliances of application instances running on a cloud platform in accordance with implementations of the present disclosure.

In some instances, the example method 300 can be executed at a cloud platform similar to the cloud platform 200 of FIG. 2, or the cloud environments 106 and/or 108 of FIG. 1.

In some instances, multiple applications can be deployed at a cloud platform. The applications can provide services to end users. An application can be deployed with multiple instances, where different instances can be deployed at different zones or regions of the cloud platform. The applications can be executed on runtime environments provided by the cloud platform. In some instances, the application instances on the cloud platform can be evaluated for incompliances. Different types of incompliances can be identified for different instances. For example, an incompliance that can be associated with the first instance of the first cloud application can be an incompliance of a runtime environment used for executing the first instance of the first cloud application. The runtime environment may have a version that is used for executing the first instance that can differ from one or more compliant versions of a runtime environment that is to be used by cloud applications running on the cloud platform.

In some instances, an incompliance that can be associated with the first instance of the first cloud application is an incompliance of a runtime environment used for executing the first instance of the first cloud application, wherein the runtime environment used for executing the first instance differs from one or more compliant versions of a runtime environment that is to be used by cloud applications running on the cloud platform.

In some instances, the cloud platform can include application instance maintenance services configured to evaluate a compliance state of running instances at the cloud platform. These auditing services can be implemented at a compliance service similar to the compliance service 220, and can provide multiple compliance monitors that can evaluate running application instances and generate compliance requests. The generation of the compliance request may be similar to the generation of compliance requests by compliance monitors as described for FIG. 2.

In some instances, performing the auditing can include performing compliance verification by evaluating runtime configurations of runtime environments where instances of an application are running. In some instances, performing compliance verification includes performing security checks associated with an instance of an application and identifying a security incompliance associated with a runtime environment for executing the instance of the application.

At 310, in response to generating compliance requests for one or more incompliant instances of one or more cloud application running on the cloud platform, compliance checks for the one or more incompliant instances of cloud applications can be automatically executed. The one or more incompliant instances can be associated with one or more incompliances identified at the one or more incompliant application instances. In some instances, the incompliances can be identified by different compliance monitors from a plurality of compliance monitors instantiated at the cloud platform. In some instances, each compliance monitor of the plurality of compliance monitors is responsible for identifying a different type of incompliance of a cloud application, where one instance of a cloud application is associated with one or more different types of incompliance. In some other instances, one compliance monitor can be responsible for several types of incompliances, while different monitors can be responsible for non-overlapping sets of types of incompliances.

In some instances, each compliance monitor of the plurality of compliance monitors maintains rules for evaluating statuses of instances of cloud applications running on the cloud platform. The rules maintained by each compliance monitor correspond to each type of incompliance for which the compliance monitor is responsible. At 320, in response to identifying that a first instance of a first cloud application has a first type of incompliance after executing a corresponding compliance check, a maintenance action is scheduled to be automatically executed by a first compliance maintainer. The first compliance maintainer can be running on the cloud platform, and may be similar to or different than the compliance maintainers at the compliance executor 250 of FIG. 2. The first compliance maintainer can be configured to execute compliance measurement actions for a first type of incompliance identified at the first instance of the first cloud application.

At 330, the maintenance action is automatically executed by the first compliance maintainer at the first application instance of the first cloud application. In some instances, the method 300 may further comprise operations associated with the execution of the maintenance action by the cloud platform. In some instances, current metadata for the first instance of the first cloud application can be retrieved from the first instance of the first cloud application. Further, latest metadata for the first cloud application can be retrieved from an application database storing metadata for applications and application instances run on the cloud platform. The latest metadata can include latest deployment configuration data used for deploying instances (e.g., the first instance or another instance) of the first cloud application. In those instances, in response to identifying that the compliance measurement action is not executed for the first instance of the first cloud application, the current metadata and the latest metadata is evaluated to generate metadata for starting a new instance of the first cloud application. The current metadata associated with the first instance is compared with the latest used metadata for instantiating a latest instance of the first cloud application to determine the metadata for configuring the new instance of the first cloud application. The evaluation of the current metadata and the latest metadata can be performed according to predefined rules for evaluation that can be defined for different scenarios for compliance issues and combination of possible configuration parameters associated with the runtime environment (and corresponding version), runtime engine (and corresponding version), and/or further configuration metadata. The rules for evaluation of the metadata can implement logic associated with compatibility between different combinations of configuration parameters and a deployed version of the instance associated with the compliance request and the latest deployment of the first cloud application (e.g., for another latest instance that is started for the first cloud application on the cloud platform). The new instance can be started, and the first instance of the cloud application can be deprecated and stopped.

In some instances, an incompliance request can be associated with an identification that the first instance of the first cloud application is running on an outdated version of an operating system (OS), and that the OS version should be updated. In those instances, when a new instance for the first cloud application is started, a recommended version of the OS can be used to start the new instance. For example, the outdated version of the OS can be associated with vulnerabilities (e.g., security vulnerabilities). In some instances, a compliance maintainer can determine a version of a runtime and a runtime engine (e.g., Java Virtual Machine) that were used when running the first instance of the cloud application.

For example, information about the versions of the runtime, the runtime engine, or other deployment and/or application data can be acquired from stored metadata for the first instance of the cloud application. For example, the compliance maintainer can retrieve the metadata from an application entity manager. Additionally, it may be determined what are the latest deployment configurations for the first cloud application. For example, a latest used runtime and/or runtime engine that was used to deploy a latest instance of the first cloud application can be determined. In some instances, latest deployment configurations metadata can be retrieved and it can be determined that the latest deployment configuration is different from the configuration that was used for the first instance of the cloud application. For example, if the first instance of the cloud application has not been redeployed with new configurations, then the first instance of the first cloud application has not been updated to the latest deployment configuration. In those instances, the new instance of the first cloud application can be started by using the same version of runtime and runtime engine as determined to be used by the first instance of the first cloud application, and the latest deployment configurations for the first cloud application can be disregarded for the instantiation of the new instance. For example, by doing so, the new instance of the first cloud application is started in the same runtime environment to reduce (or partially or completely avoid) chances of possible incompatibilities of the application binaries with a newer version of the runtime and the runtime engine. If the first instance of the cloud application has been redeployed with the new configurations, then the new instance of the cloud application can be started using the latest configurations defined for the first cloud application. In some instances, the compliance maintainer can retrieve metadata for the first instance of the first cloud application including the current configuration metadata, and can retrieve metadata for the first cloud application as a whole (e.g., determine what was the configuration metadata used for one or more of the latest started instances of the first cloud application). Further, the compliance maintainer can initiate the start of the new instance by providing a reference to determined configuration when such configuration is not the latest defined configuration for the first cloud application. For example, the compliance maintainer can input the exact same version of the runtime and the runtime engine of the first instance when instantiating the new instance of the first cloud application in response to executing a maintenance action for the first instance of the first cloud application.

In some instances, the first cloud application may have been updated and redeployed after the first instance of the first cloud application has been started. Therefore, when a new instance of the first cloud application is about to be started, a determination for latest configurations as well as changes in the binaries of the first cloud application can be determined. For example, if the first cloud application has updated binaries, then those new binaries would be used for starting the new instance and the latest configurations would be applied.

In some instances, compliance monitors established at the cloud platform may audit a plurality of instances of cloud applications on the cloud platform based on corresponding configured rules defined for the cloud applications. In response to the auditing and determining that one or more incompliances exist, multiple compliance requests can be created. For example, the first compliance request (e.g., a compliance request associated with a first incompliance identified at the first instance of the first cloud application) can be created by a first compliance monitor, and a second compliance request (e.g., one associated with a second incompliance identified at the first instance of the first cloud application) can be created by a second compliance monitor. The first compliance monitor can be responsible for identifying the first type of incompliances at the cloud applications, wherein the first compliance request includes a first time period defined for awaiting execution of compliance measurements to remedy the first incompliance. The second compliance monitor is responsible for identifying a second type of incompliances at the cloud applications, and the second compliance request can include a second time period defined for awaiting of execution of compliance measurements to remedy the second incompliance. The first and second compliance requests can be stored by each of the compliance monitors at a persistence storage, such as, for example, storage similar to the compliance DB 265 of FIG. 2. In some instances, the first notification and the second notification can be provided to the contact entity or entities defined for the first instance by a single notification component of a plurality of notification component, where the notification component corresponds to the first communication channel that is determined.

In some more instances, the first notification can be provided to one or more entities defined for the first instance of the first cloud application by a corresponding one or more notification components. The notification components used to notify the entities can each correspond to a type of communication channel that is identified (e.g., e-mail, phone, instant messaging, etc.). In some instances, one notification component can handle generation and providing of notifications associated with multiple instances associated with one or more cloud applications running on the cloud platform.

In some instances, in response to creating and storing the first and the second compliance requests, a first notification for the first instance of the first cloud application and a second notification for the first instance of the first cloud application can be generated. In some instances, once requests are created and stored, they can be read and notifications can be correspondingly generated. The first notification can be determined to be sent over a first communication channel of a plurality of communication channels to a contact entity defined for the first instance of the first cloud application. For example, metadata for the first cloud application may include data for the contact entity that can be associated with a suitable communication channel(s). In case there are multiple communication channels for sending a notification, one channel can be selected randomly, or the selection of a channel may comply with a rule for determination of an appropriate channel for communication. The rule for determining the channel can be based on statistical evaluation of executed notifications and their success rate of follow-up actions executed for the notified instances. In some instances, the second notification can be determined to be sent over the first communication channel of a plurality of communication channels to the contact entity defined for the first instance of the first cloud application. In some other instances, the second notification can be determined to be sent over a different communication channel, if such indication for the availability of the different communication channel is identifiable for the first cloud application, and if such selection of different channels for contacting a customer entity for a single application in relation to different incompliances is suitable.

Figure 4:
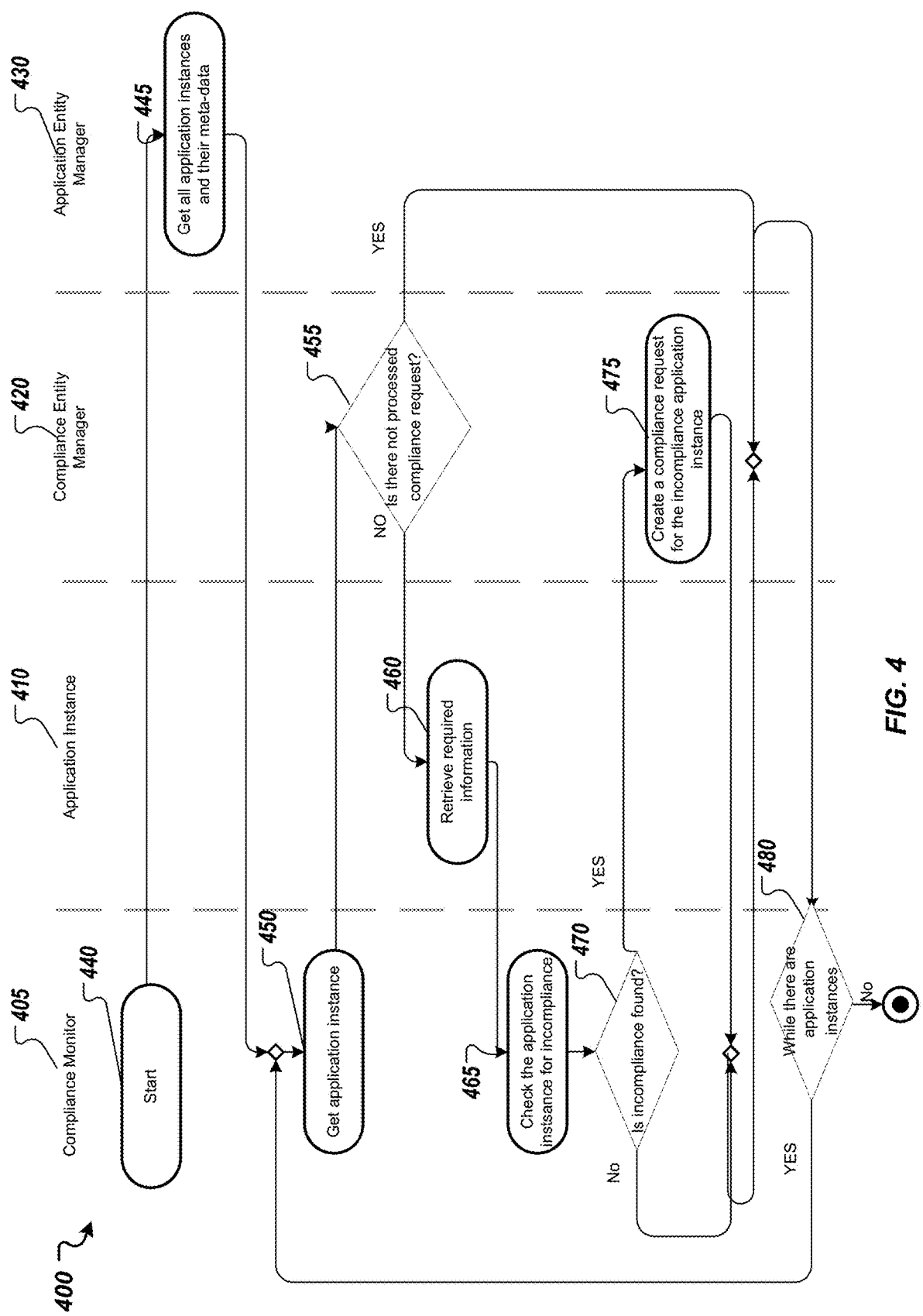
FIG. 4 is a swim lane diagram for an example method for generating compliance requests for incompliant instance of applications running on a cloud platform in accordance with implementations of the present disclosure.

FIG. 4 is a swim lane diagram for an example method 400 for generating compliance requests for incompliant instance of applications running on a cloud platform in accordance with implementations of the present disclosure. In some instances, the compliance request can be generated based on auditing performed by a compliance monitor 405. In some instances, the compliance monitor 405 can be similar to the compliance monitors of the compliance service 220 of FIG. 2. The compliance monitor 405 can be instantiated on the cloud platform to provide maintenance compliance service to determine whether there are running application instances that do not comply with cloud platform configured requirements and implement an automatic procedure to provide the instance in a compliant state. In some instances, and as discussed for the description of FIG. 2 and FIG. 3, a cloud platform may include a compliance service where multiple compliance monitors can be implemented. With this regard, compliance monitor 405 can be considered as an example monitor while other monitors can also be running on the cloud platform, for example in parallel, sequentially, or in a defined execution order. The compliance monitor 405 can be implemented with logic to perform compliance verification for instances running on the cloud based on predefined rules to determine incompliances related to a particular type of incompliance. For example, the compliance monitor 405 can be implemented with logic to determine incompliances of the runtime environment used for executing application instance on the cloud platform. In this example, the compliance monitor 405 can be configured with rules to evaluate data related to the multiple instances on the cloud platform and to identify whether they conform to a rule for evaluating the runtime environment. In some instances, such rule can include a set of runtime environment types with a corresponding version number, where the set of environments may be associated with different development and deployment technologies for executing customer applications.

In some instances, the example method 400 is executed at a cloud platform similar to the cloud platform 200 of FIG. 2.

In some instances, the cloud platform includes multiple application instances that are deployed on the cloud platform as customers' applications. For example, application instance 410 is an example instance of multiple application instances on the cloud platform. It can be appreciated that the method 400 can execute steps with respect to application instances on the cloud platform in the same manner as the operations performed for the application instance 410.

In some instances, when the compliance monitor 405 is executed on the cloud platform, it is configured to perform auditing on application instances running on the cloud platform in association of a particular type of incompliance.

At 440, the compliance monitor 405 starts its execution. The compliance monitor 405 can be triggered based on a predefined time trigger (e.g., on regular time intervals, based on a predefined execution schedule, or other suitable execution regime) to retrieve current information for all application instances running on the cloud platform. At 445, the compliance monitor 405 retrieves the information for the application instances and metadata for these application instances from an application entity manager 430. The application entity manager 430 may be running on the cloud platform and may store information for deployed, started and/or stopped, deprecated, other type of applications that have been running or have been provided for running at the cloud platform.

When information (including metadata) for all application instances that are currently running on the cloud platform is retrieved by the compliance monitor 405, the compliance monitor executes a sequence of steps for each application instance on the cloud platform to determine compliance state of each instance and to generate relevant compliance requests for instances that do not comply with a particular compliance criteria (or a type of a compliance).

At 450, the compliance monitor 405 determines a first identified application instance, i.e., application instance 410. At 455, it is determined at a compliance entity manager 420 whether there are unprocessed compliance requests that have been created for the application instance 410. The compliance entity manager 420 can be similar to the compliance entity manager 260 of FIG. 2. The compliance entity manager 420 may store generated compliance requests for instance of cloud applications at the cloud platform.

If there are compliance requests that are not yet processed for the application instance 410, the method 400 proceeds to identifying a next application instance, different from the application instance 410, and determining whether there are not processed compliance requests. If there are more application instances, as determined at 480, then information for a next application instance can be gathered and it is determined whether there are not processed requests for that subsequent instance. The process can be performed iteratively several times to iterate over further application instances, in case whether these instances have compliance requests that are not yet processed.

If there are no compliance requests that are not yet processed, the method 400 proceeds to 460, to retrieve required information from the application instance 410. At 465, the compliance monitor 405 determines whether the application instance 410 is compliant. If it is determined, at 470, that the application is compliant, the method 400 proceeds to 480 to determine whether there are more application instances that are to be processed, and the method returns to operation 450 to gather information for a subsequent application instance that has not yet been reviewed. If it is determined, at 470, that the application instance 410 is not compliant, then at 475, a compliance request is created for the application instance 410 at the compliance entity manager 420.

If it is determined at 480 that there are no more application instances for processing, the method 400 exits the evaluation. Based on such a method execution that can be executed based on multiple compliance monitors associated with different types of incompliances, and multiple application instances that are evaluated, a number of incompliance request can be generated and stored at the compliance entity manager 420.

Figure 5:
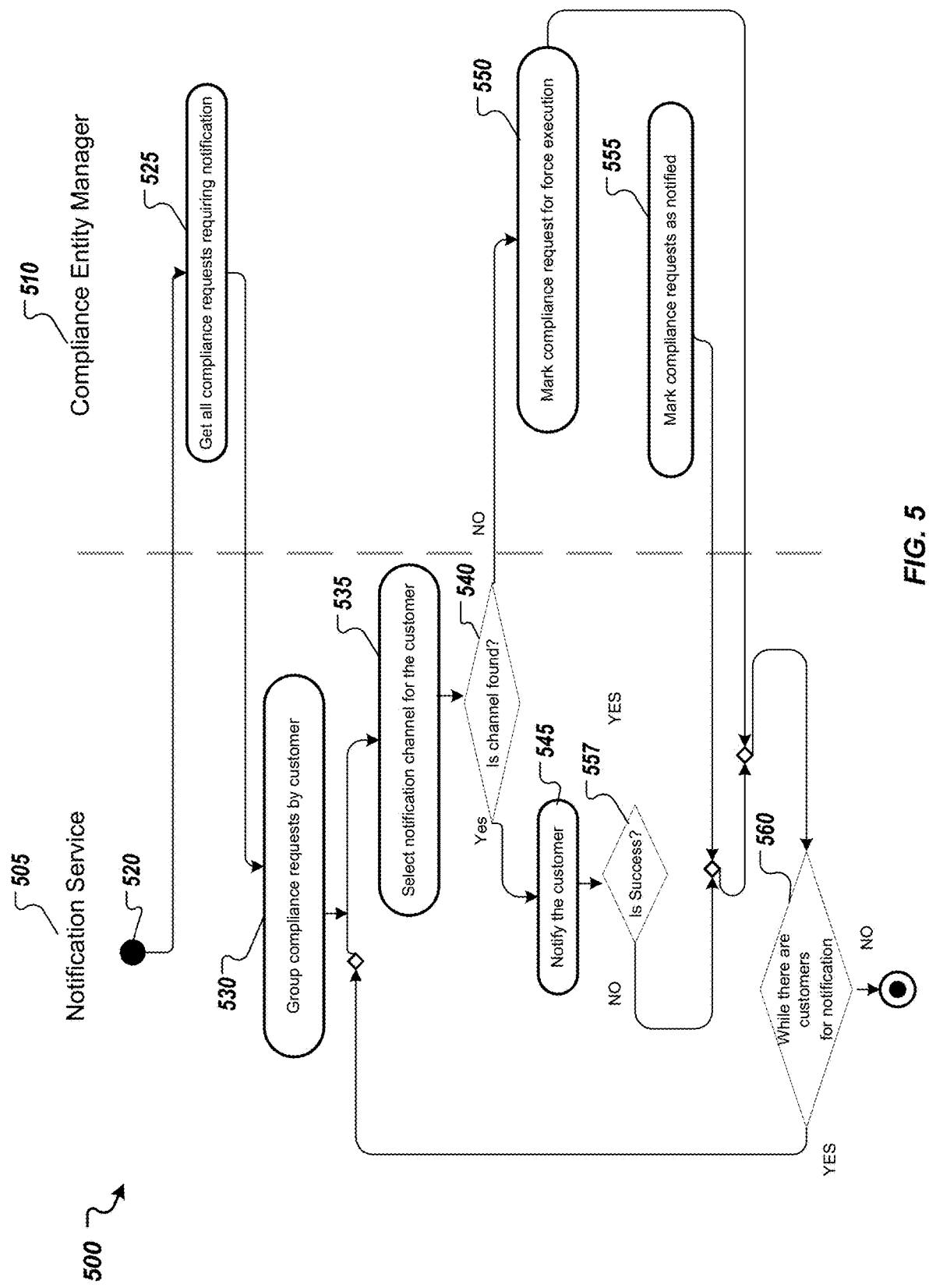
FIG. 5 is a swim lane diagram for an example method for managing execution of notifications to customers of cloud applications associated with one or more incompliant instances in accordance with implementations of the present disclosure.

FIG. 5 a swim lane diagram for an example method 500 for managing notifications to customers of cloud applications associated with one or more incompliant instances in accordance with implementations of the present disclosure. In some instances, and as discussed in the description of FIGS. 2 and 3, a cloud platform may include a compliance service where multiple compliance monitors can be implemented and compliance requests can be created for incompliant application instances running on the cloud platform. When an incompliance request is created, the request is stored through a compliance entity manager 510 at a persistence store. For example, the compliance entity manager 510 may be similar to the compliance entity manager 260 of FIG. 2.

In some instances, notifications for created compliance requests can be communicated to relevant entities through a notification service 505. The notification service 505 can be similar to the notification service 230 of FIG. 2.

At 520, a notification service 505 is started to process stored compliance requests to execute notifications. At 525, the notification service 505 requests the compliance entity manager 510 to provide, or provide access to, the compliance requests that require notification. In some instances, compliance requests that require notification can be requested where no notification has been already sent out, or the request can be associated with one or more notification requests from a set of notification requests that are defined as required to be sent out. This means that for a compliance request that is defined to be associated with a set of notifications, not all of the notifications of the set had been sent out.

At 530, the notification service 505 acquires all the compliance requests that require notification and groups those requests by customers associated with the corresponding application instances relevant to the compliance requests.

For each customer, the notification service 505 selects a proper notification channel at 535. At 540, a determination is made as to whether a notification channel can be identified for the corresponding customer. If a channel cannot be found by the notification service 505, the compliance entity manager 510 marks the compliance request for a forced execution at 550. Method 500 then proceeds to 560, where it is determined whether there are more customers that need to be notified. If, at 540, a channel is found, then the notification service notifies the customer via the found channel at 545. In some instances, the customer can be notified for all of the compliance requests at once and through a single channel. In other instances, the customer can be notified separately for the different compliance requests, or in groups or batched notifications that include compliance requests corresponding to different applications and/or application instances. In some more instances, the customer can be notified for compliance requests through multiple notification channels in parallel, or through multiple communication channels for different groups of compliance requests.

At 557, a determination is made as to whether the notification is successful. If the notification is successful, the compliance entity manager 510 marks the compliance requests as notified at 555. Method then proceeds to 560, where a determination is made as to whether there are more customers that need to be notified. If more customers need to be notified (based on the determination at 560), the method 500 proceeds to selecting a notification channel for a next customer associated with another group from the groups identified at 530.

If at 557, it is determined that the notification is unsuccessful, the process 500 continues to 560, and a determination is made as to whether there are more customers for notification(s). In those instances, multiple iterations can be executed over one customer to determine a communication channel. In some instances, additional steps may be performed to acquire a notification channel information that can be executed as part or separate from the method. For example, a notification message for the user interface of the application instance can be pushed, e.g., after a predefined period of time, when a notification channel cannot be determined for the relevant customer. In some instances, if a proper channel for executing successful communication cannot be determined (e.g., after one or more iterations over steps 530 to 560 from method 500), the compliance request can be marked for force execution.

The method 500 ends when all customers are iteratively reviewed for determination of a communication channel to dispatch notifications, and those notifications are sent for those customers who can be notified.

Figure 6:
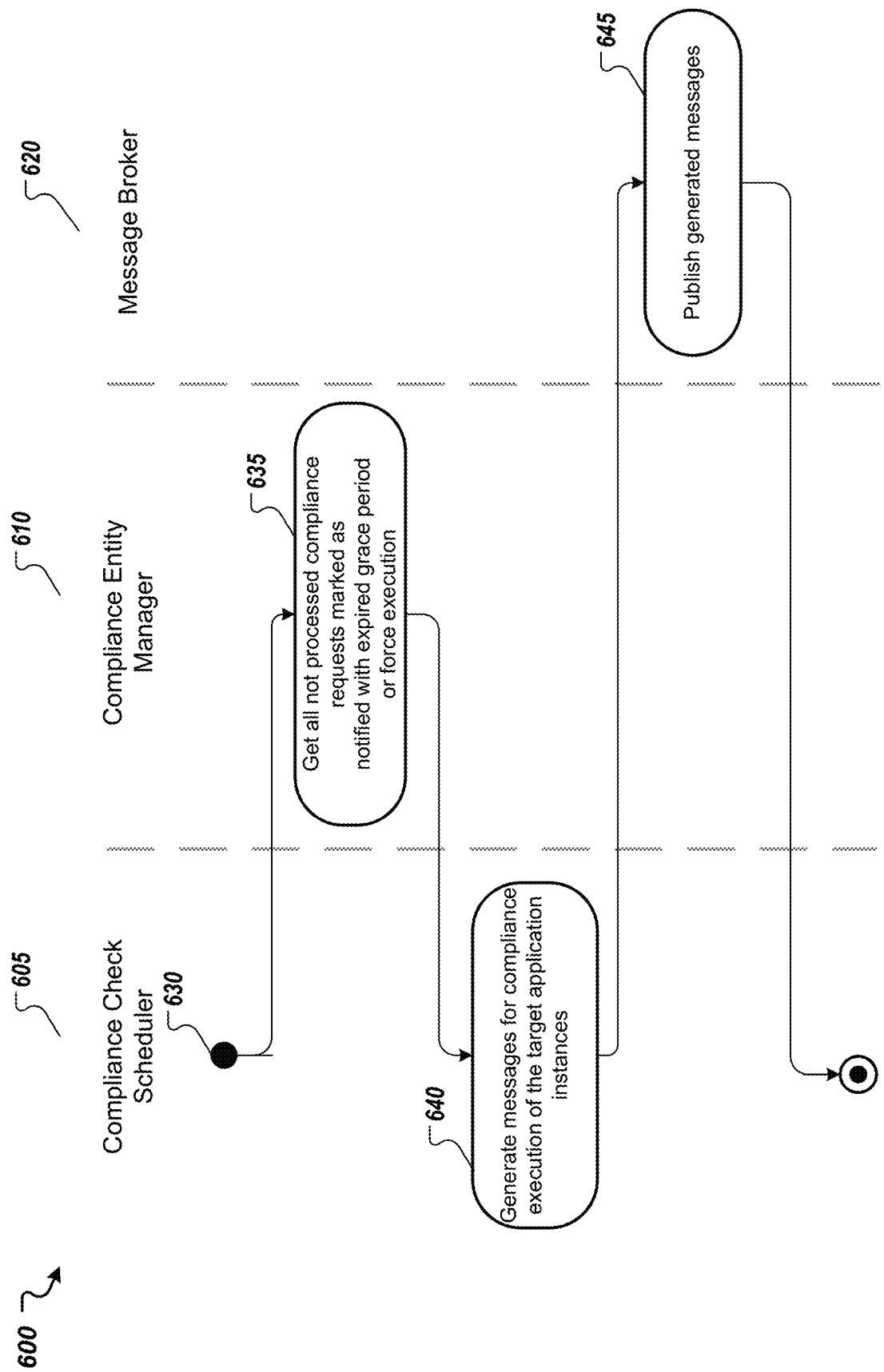
FIG. 6 is a swim lane diagram for an example method for executing compliance checks for identified and notified incompliant instances of cloud applications running on a cloud platform in accordance with implementations of the present disclosure.

FIG. 6 a swim lane diagram for an example method 600 for executing compliance checks for identified and notified incompliant instances of cloud applications running on a cloud platform in accordance with implementations of the present disclosure. In some instances, the example method 600 can be executed at the cloud platform, where the cloud platform is similar to the cloud platform 200 of FIG. 2. In those instances, or in other instances, method 600 may be performed to execute compliance check in a corresponding manner to the operations executed by the compliance check scheduler 240 of FIG. 2.

In some instances, the method 600 can be subsequently executed after the execution of the method 500 where compliance requests that are associated with executed notification are marked (at 555).

When notifications are sent for compliance requests that are generated for application instances running on the cloud platform that are incompliant, follow-up steps can be performed to schedule messages for execution of compliance actions.

At 630, the compliance check scheduler 605 sends a request to a compliance entity manager 610 to acquire all compliance requests that are marked as notified, and where a time period defined for or associated with those requests for taking maintenance actions has expired. The compliance entity manager 610 may also acquire all compliance requests that are marked for forced execution.

In some instances, the compliance entity manager 610 can be similar to the compliance entity manager 510 of FIG. 5, and the compliance requests can be marked as notified and/or as required to be force executed by the compliance entity manager 610, as described at FIG. 5.

At 640, the compliance check scheduler 605 generates messages for compliance executions that are to be triggered at target applications (or can be defined on application instances level) correspondingly associated with the compliance requests that have been acquired at 635.

At 645, the compliance check scheduler 605 publishes the generated messaged through a message broker 620, wherein the message broker 620 communicates with a compliance executor for the executions at the target application (or application instances) later on (not shown on FIG. 6). In some instances, the message broker 620 can be similar to the message broker 245 of FIG. 2.

Figure 7:
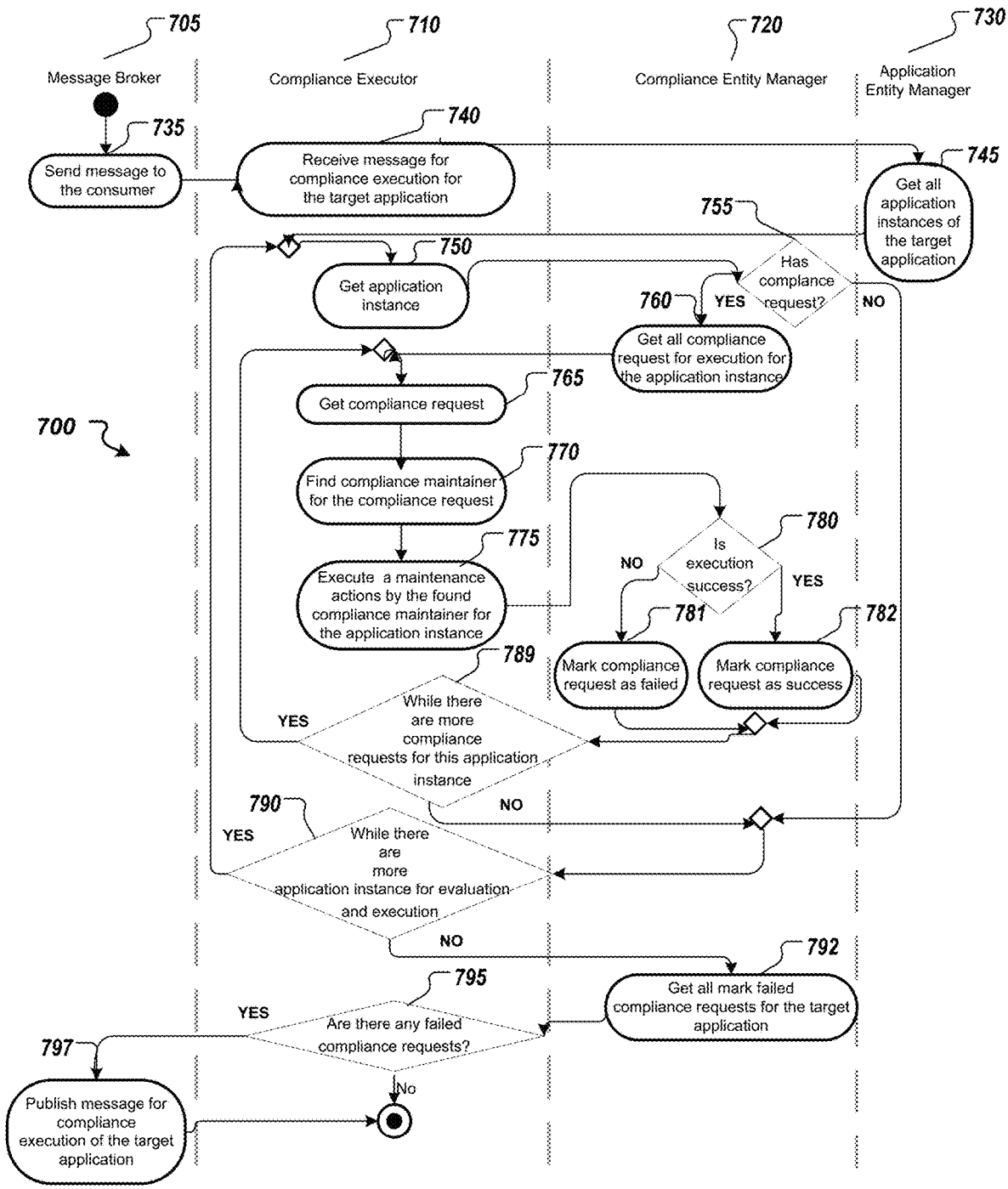
FIG. 7 is a swim lane diagram for an example method for executing maintenance actions at one or more incompliant instance of one or more cloud application running on a cloud platform in accordance with implementations of the present disclosure.

FIG. 7 is a swim lane diagram for an example method 700 for executing maintenance actions at one or more incompliant instance of one or more cloud application running on a cloud platform in accordance with implementations of the present disclosure. The method 700 can be executed based on operations performed at a message broker 705, a compliance executor 710, a compliance entity manager 720, and an application entity manager 730, where these components may be similar to or different than similarly named components in some or all of FIGS. 2-6.

In some instances, the method 700 is performed to execute maintenance actions at application instances running on the cloud platform that had been identified as incompliant, or as associated with various incompliances (as previously described, for instance), and have also been notified of the incompliances, but that are determined to still have those incompliances even after a time period to perform remedial action has elapsed.

In some instances, the method 700 can be executed based on messages for execution of the maintenance actions that are published at the message broker.

At 735, the message broker 705 sends a message to a consumer providing a notification that an automated execution of one or more compliance actions associated with an application identified as incompliant (i.e., even after a sent notification) is about to be executed.

At 740, the compliance executor 710 can receive a message for compliance execution for a target application from the message broker 705.

At 745, the compliance executor 710 retrieves all application instances for the target application from the application entity manager 720.

At 750, the compliance executor 710 executes the following steps for each retrieved application instance of the target application that is identified with the received message at 740.

At 755 a determination is made as to whether there are existing compliance requests for that application instance. If there are no compliance requests, method 700 proceeds to 790 to evaluate whether there are more application instances and to proceed with a next application instance for evaluation and subsequent execution of maintenance actions.

When the determination at 755 is that there are existing compliance requests for an application instance, then the compliance entity manager 720 executes those compliance requests one-by-one at 760. At 765, the compliance executor 710 obtains a compliance request, and, at 770, finds, locates, or otherwise identifies a corresponding compliance maintainer for the processed request. The compliance maintainer may be similar to the compliance maintainers describes as part of the compliance executor 250 of FIG. 2. The compliance maintainer found at 770 can be a compliance maintainer responsible for executing maintenance actions relevant for the type of incompliance associated with the identified compliance request(s). At 775, the compliance executor 710 provides instructions to the determined compliance maintainer to execute implemented logic at the compliance maintainer on the relevant application instance. In response, a maintenance action can be performed on the application instance to return the application instance into a complaint state.

At 780, a determination is made as to whether the execution of the maintenance action is performed successfully. If so, the compliance request is marked as successfully executed by the compliance entity manager 720 at 782. If not successful, the compliance request is marked as failed at 781.

At 789, a determination is made as to whether additional compliance requests remain for the current application instance. If they do, then the next request is processed at 765 in a similar manner as the previously processed request.

If, at 789, a determination is made that no more compliance requests for the particular application instance remain, then method 700 proceeds to 790, where a determination is made as to whether more application instances remain for further evaluation and action execution. If no more application instances remain, then at 792, all of the failed compliance requests for the processed application are marked by the compliance entity manager 720.

If it is determined that more instances need to be evaluated and actions need to be executed at 790, then method 700 proceeds to obtain information for a subsequent application instance at 750, where the subsequent instance is processed in a corresponding manner.

Then, at 795, a determination is made as to whether any failed compliance requests have not been processed successfully (e.g., those requests marked at 781). If those failed compliance requests exist, then messages for those compliance requests are published at the message broker 705 at 797. In some instances, and based on a published message for a compliance request that has already been processed once, a second evaluation of the requests and an attempt to execute maintenance actions can be performed before the method finishes.

If there are no failed compliance requests (as determined at 795), then method 700 can finish.

Figure 8:
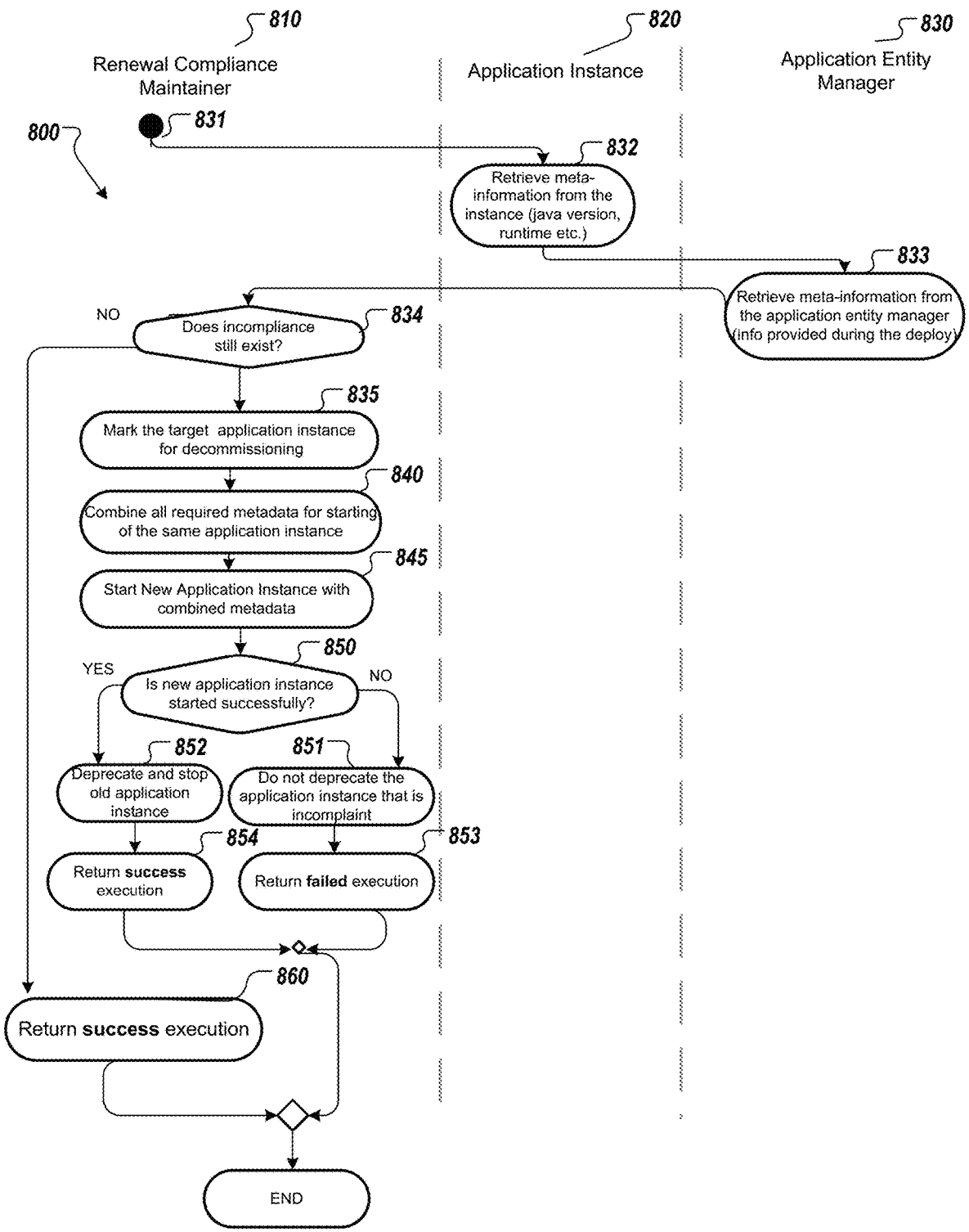
FIG. 8 is a swim lane diagram for an example method for managing incompliances of runtime environments of cloud application instances in accordance with implementations of the present disclosure.

FIG. 8 a swim lane diagram for an example method 800 for managing incompliances of runtime environments of cloud application instances in accordance with implementations of the present disclosure. The method 800 can be executed on a cloud platform similar to or different than that described in FIGS. 1-7. The method 800 can be executed when managing incompliances identified at application instances of applications running on the cloud platform, and, in some instances, can be similar to or different from the implementations described for the application instances evaluated at FIGS. 1-7 to maintain the running application instance in a complaint state by automatically executing maintenance actions when such actions are not performed by customers of incompliance application instance within a predefined time period.

In some instances, and as described for method 700 for executing maintenance actions at one or more incompliant instance of one or more cloud application running on the cloud platform, maintenance actions are performed by compliance maintainers included in a compliance executor 710. In some instance, when such maintenance actions are performed, those actions can affect the performance of a relevant application instance.

In some instances, to support high availability of application instances running on the cloud platform, where the application instances are maintained in a complaint state based on maintenance services implemented at the cloud platform, a renewal compliance maintainer 810 can be provided at the cloud platform to support the execution of the maintenance process and to reduce downtime for application instances that undergo maintenance actions executed by compliance maintainers of the cloud platform.

In some instances, the renewal compliance maintainer 810 can be configured to renew a runtime environment, by providing a new runtime environment with a newer version that can be used for executing an application instance that has been identified as running on a runtime environment that is not compliant. An example of non-compliance may be that the current version has security vulnerabilities that need to be addressed by an update.

At 831, the renewal compliance maintainer 810 starts to process the message sent by a compliance check scheduler (e.g., the compliance check scheduler 240 of FIG. 2, or the compliance check scheduler 605 of FIG. 6) that have been published through a message broker, as previously described. The processed messages are associated with found incompliances at one or more application instances.

At 832, the renewal compliance maintainer 810 retrieves current metadata from the application instance. The current metadata may include data for the runtime environment that is used by the application instance. For example, the current metadata can include data defining which is the Java version and Runtime version used by the application instance.

At 833, the renewal compliance maintainer 810 retrieves the latest metadata for the cloud application from an application entity manager 830. The application entity manager 830 can be part of the cloud platform that stores data for deployed and running applications with their corresponding application instances. The application entity manager 830 can store configuration information for the deployment of application instance on the cloud platform. The retrieved latest metadata includes the latest deploy parameters used by the customer to deploy a latest application instance of the cloud application on the cloud platform.

In some instances, a compliance request can be associated with changing a version of the OS used for running an instance of a cloud application. In some instances, when a change of the OS version for a given instance has to be performed, the instance can be rebooted and started on a new OS version. Such rebooting can be used to apply pending patches (e.g., fixes, such as regular OS patches) for the OS during the reboot of the VM where the application instance is running. In some other instances, when a change of the OS version for a given instance has to be performed, a virtual machine where the application instance is running can be stopped, and the application instance can be started on a new VM. For example, such start of a new VM for running the application instance can be executed in cases of a version update of the OS that can be associated with substantial differences in the provided resources from the OS that is used for the old application instance and is to be changed. In some instances, the application entity manager 830 may not store information about the OS of the running instance of application or redeployed application. Therefore, by retrieving the current metadata of the running instance and the latest metadata stored for the application (e.g., metadata for a latest started instance of the application), it can be determined which deployment parameters are to be used when deploying a new instance that can be compatible with the OS that is supposed to be used for the new instance.

In yet another example, a compliance request can be associated with updating a runtime environment and/or a runtime engine (e.g., if the runtime environment and/or the runtime engine is not compliant). In those examples, Once the metadata is retrieved, the renewal compliance maintainer determines, at 834, whether an incompliance still exists at the application instance that is reviewed. For example, the renewal compliance maintainer 810 may determine if the application instance is still using a Java version and/or a runtime version that are incompliant. If it is determined that there is no incompliance, then method 800 proceeds to 860, and can return a notification indicating a successful processing of the application instance, and method 800 can end.

If, at 834, a determination is made that an incompliance still exists, then, at 835, the renewal compliance maintainer 810 performs the following series of operations.

At 835, the renewal compliance maintainer 810 marks the target application instance for deprecation (or decommissioning).

At 840, the renewal compliance maintainer 810 generates required metadata for starting of the new application instance (e.g., the same instance as the first application instance or a new version that relies on updates for the binaries of the first cloud application). In some instances, the required metadata for starting the new instance of the first cloud application can be based on evaluating the current metadata and the latest metadata to generate combined according to evaluation rules. The evaluation rules can include rules associated with technical and compatibility requirements of the first cloud application. In some instances, the current metadata for the first instance of the first cloud application can be compared with the latest metadata for the first cloud application (e.g., used for a latest instance that was deployed and started on the cloud platform). In some instances, the retrieved metadata can include information for updates in the binaries of the first cloud application, and a determination whether the first instance of the first cloud application is deployed and running based on the latest binary files. In some instances, the retrieved metadata can be evaluated based on logic associated with compatibility between the latest configurations and binaries for the first cloud application and the current state of the first instance of the cloud application to determine the required metadata for starting a new application instance.

At 845, a new application instance is started based on the generated metadata.

At 860, a determination is made as to whether the new application instance has started successfully. If the application instance has started successfully, the application instance that is associated with the identified incompliance is deprecated and stopped at 852. At 854, a notification for a successful execution can be provided, and the method 800 finishes.

If the new application instance is determined to not have started successfully, then at 851, the renewal compliance maintainer 810 can remove the application instance that is associated with the incompliance from a list of instances that are to be deprecated. At 853, the renewal compliance maintainer 810 returns a notification for a failure during the operation of starting a new application instance that can be used to replace the application instance that has an identified incompliance.

In some instances, if a new application instance has failed to start, the failed instance can be evaluated and marked for a retry, for example, a new start operation for the new instance can be triggered if it is determined that the failure was associated with a temporary issue. If a determination can be made that the start of the application instance has failed due an application issue, the application may be identified as relevant for a retry, or the application can be forcefully restarted. In some instances, the execution of operations in response to determining a failure in starting an application may be associated with an evaluation (e.g., a manual or semi-automated investigation). In some instances, a failure in starting an application can trigger an automated process initiating a retry to start of the application for a predefined number of times, and if the failure is maintained, the process may finish. Further action can be potentially executed once a process has finished with an unsuccessful result of a start of an application instance.

Figure 9:
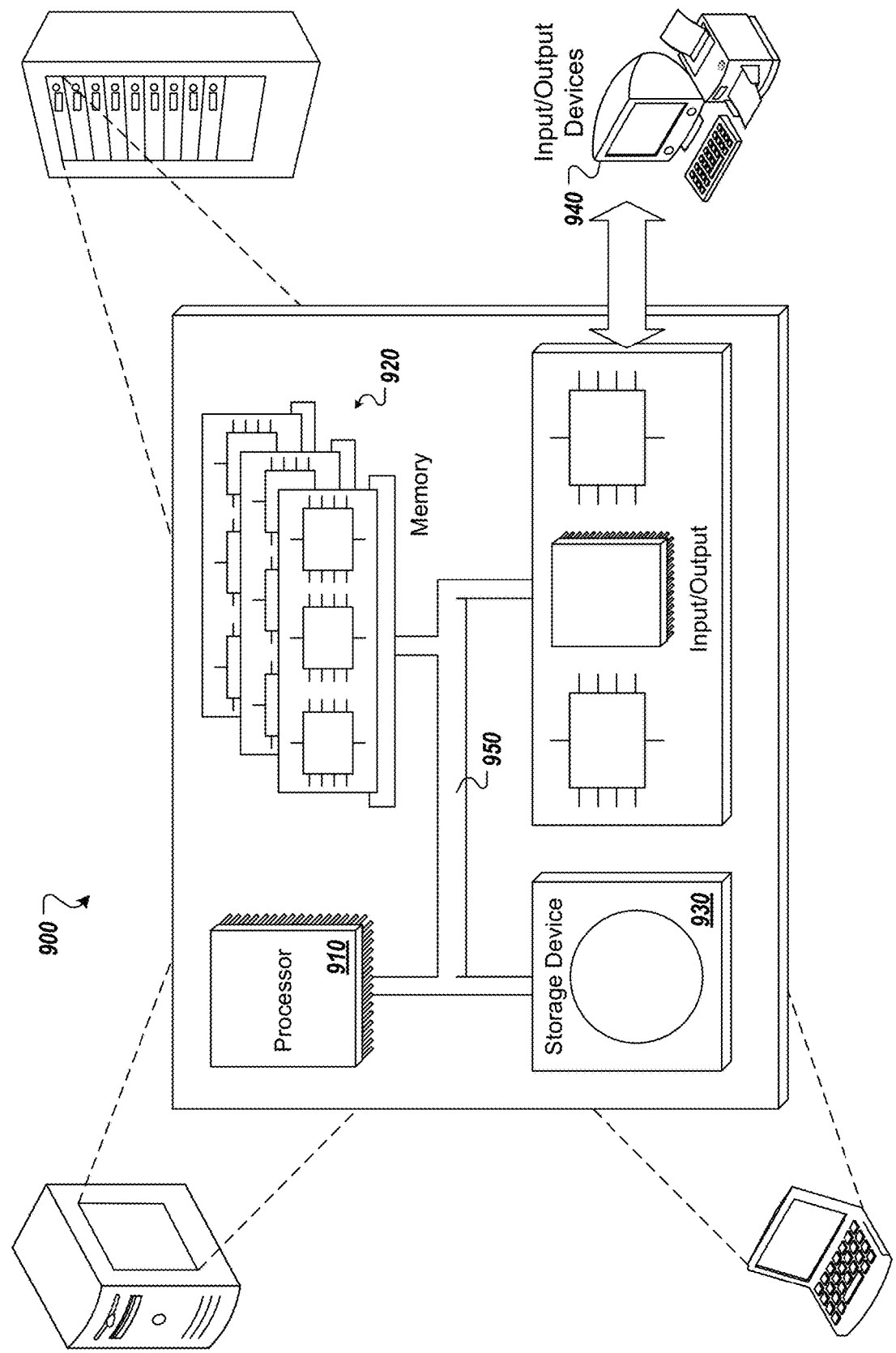
FIG. 9 is a schematic illustration of example computer systems that can be used to execute implementations of the present disclosure.

Referring now to FIG. 9, a schematic diagram of an example computing system 900 is provided. The system 900 can be used for the operations described in association with the implementations described herein. For example, the system 900 may be included in any or all of the server components discussed herein. The system 900 includes a processor 910, a memory 920, a storage device 930, and an input/output device 940. The components 910, 920, 930, and 940 are interconnected using a system bus 950. The processor 910 is capable of processing instructions for execution within the system 900. In some implementations, the processor 910 is a single-threaded processor. In some implementations, the processor 910 is a multi-threaded processor. The processor 910 is capable of processing instructions stored in the memory 920 or on the storage device 930 to display graphical information for a user interface on the input/output device 940.

The memory 920 stores information within the system 900. In some implementations, the memory 920 is a computer-readable medium. In some implementations, the memory 920 is a volatile memory unit. In some implementations, the memory 920 is a non-volatile memory unit. The storage device 930 is capable of providing mass storage for the system 900. In some implementations, the storage device 930 is a computer-readable medium. In some implementations, the storage device 930 may be a floppy disk device, a hard disk device, an optical disk device, or a tape device. The input/output device 940 provides input/output operations for the system 900. In some implementations, the input/output device 940 includes a keyboard and/or pointing device. In some implementations, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

EXAMPLES

Although the present application is defined in the attached claims, it should be understood that the present invention can also (alternatively) defined in accordance with the following examples:

Example 1. A computer-implemented method for managing incompliances of application instances running on a cloud platform, the method comprising:

in response to generating compliance requests for one or more incompliant instances of one or more cloud applications, automatically executing compliance checks for the one or more incompliant instances of cloud applications running on the cloud platform, wherein the one or more incompliant instances are associated with one or more incompliances identified at the one or more incompliant instances, wherein the incompliances are identified by different compliance monitors from a plurality of compliance monitors instantiated at the cloud platform, and wherein each compliance monitor is responsible for a particular type of incompliances;

in response to identifying that a first instance of a first cloud application has a first type of incompliance after executing a corresponding compliance check, scheduling a maintenance action to be automatically executed by a first compliance maintainer running on the cloud platform, wherein the first compliance maintainer is configured to execute compliance measurement actions for the first type of incompliance identified at the first instance of the first cloud application; and automatically executing, by the first compliance maintainer, the maintenance action at the first instance of the first cloud application.

Example 2. The method of Example 1, wherein an incompliance that is associated with the first instance of the first cloud application is an incompliance of a runtime environment used for executing the first instance of the first cloud application, wherein the runtime environment used for executing the first instance differs from one or more compliant versions of a runtime environment that is to be used by cloud applications running on the cloud platform.

Example 3 The method of Example 1 or 2, further comprising:

retrieving current metadata for the first instance of the first cloud application from the first instance of the first cloud application;

retrieving latest metadata for the first cloud application, wherein the latest metadata includes latest deployment configuration data used for deploying a latest instance of the first cloud application;

in response to identifying that the compliance measurement action is not executed for the first instance of the first cloud application, determining metadata for starting a new instance of the first cloud application based on evaluating the current metadata and the latest metadata according to evaluation rules including rules associated with technical and compatibility requirements of the first cloud application;

starting the new instance of the first cloud application; and deprecating and stopping the first instance of the first cloud application.

Example 4 The method of any one of the preceding Examples, further comprising:

auditing, by at least some of the plurality of compliance monitors, a plurality of instances of cloud applications on the cloud platform based on corresponding configured rules defined for the cloud applications;

in response to the auditing, creating, by a first compliance monitor of the plurality of compliance monitors, the first compliance request associated with a first incompliance identified at the first instance of the first cloud application, wherein the first compliance monitor is responsible for identifying the first type of incompliances at the cloud applications, wherein the first compliance request includes a first time period defined for awaiting of execution of compliance measurements to remedy the first incompliance; and creating, by a second compliance monitor of the plurality of compliance monitors, a second compliance request associated with a second incompliance identified at the first instance of the first cloud application, wherein the second compliance monitor is responsible for identifying a second type of incompliances at the cloud applications, wherein the second compliance request includes a second time period defined for awaiting of execution of compliance measurements to remedy the second incompliance;

storing, by the first compliance monitor and the second compliance monitor, the first compliance request and the second compliance request at a persistence storage; and in response to creating and storing the first and the second compliance requests, generating a first notification for the first instance of the first cloud application and a second notification for the first instance of the first cloud application, wherein the first notification is to be sent over a first communication channel of a plurality of communication channels to a contact entity defined for the first instance of the first cloud application, wherein the second notification is to be sent over the first communication channel of a plurality of communication channels to the contact entity defined for the first instance of the first cloud application.

Example 5. The method of Example 4, wherein each compliance monitor of the plurality of compliance monitors is responsible for identifying a different type of incompliance of a cloud application, wherein one instance of a cloud application is associated with one or more different types of incompliance.

Example 6. The method of Examples 4 or 5, wherein the plurality of communication channels include e-mail communication, instant messaging, voice message communication, direct phone communication, and application-to-application communication.

Example 7. The method of any of the preceding Examples, wherein each compliance monitor of the plurality of compliance monitors maintains rules for evaluating status of instances of cloud applications running on the cloud platform, wherein rules maintained by each compliance monitor correspond to each type of incompliance for which the compliance monitor is responsible.

Example 8. The method of any of the preceding Examples, wherein auditing the plurality of instances of cloud applications further comprises:

performing compliance verification by evaluating runtime configurations of runtime environments where instances of an application is running, wherein the compliance verification comprises:

performing security checks associated with an instance of an application; and identifying a security incompliance associated with a runtime environment for executing the instance of the application.

Example 9. The method of any of the preceding Examples, wherein the first notification includes data describing the first incompliance identified at the first instance of the first cloud application.

Example 10. The method of any of the preceding Examples, further comprising: providing the first notification and the second notification to the contact entity defined for the first instance by a notification component of a plurality of notification components, wherein the notification component corresponds to the first communication channel.

Example 11. The method of any of the preceding Examples, wherein the first notification is provided to one or more entities defined for the first instance of the first cloud application by a corresponding one or more notification components, wherein a notification component corresponds to a type of communication channel, and wherein one notification component handles generation and providing of notifications associated with multiple instances associated with one or more cloud applications running on the cloud platform.

What is claimed is:

1. A computer-implemented method for managing incompliances of application instances running on a cloud platform, the method comprising:

in response to generating compliance requests for one or more incompliant instances of one or more cloud applications, automatically executing compliance checks for the one or more incompliant instances of cloud applications running on the cloud platform, wherein the one or more incompliant instances are associated with one or more incompliances identified at the one or more incompliant instances, wherein the incompliances are identified by different compliance monitors from a plurality of compliance monitors instantiated at the cloud platform, and wherein each compliance monitor is responsible for a particular type of incompliances;

in response to identifying that a first instance of a first cloud application has a first type of incompliance after executing a corresponding compliance check, scheduling a maintenance action to be automatically executed by a first compliance maintainer running on the cloud platform, wherein the first compliance maintainer is configured to execute compliance measurement actions for the first type of incompliance identified at the first instance of the first cloud application; and automatically executing, by the first compliance maintainer, the maintenance action at the first instance of the first cloud application.

2. The method of claim 1, wherein an incompliance that is associated with the first instance of the first cloud application is an incompliance of a runtime environment used for executing the first instance of the first cloud application, wherein the runtime environment used for executing the first instance differs from one or more compliant versions of a runtime environment that is to be used by cloud applications running on the cloud platform.

3. The method of claim 1, further comprising:
retrieving current metadata for the first instance of the first cloud application from the first instance of the first cloud application;
retrieving latest metadata for the first cloud application, wherein the latest metadata includes latest deployment configuration data used for deploying a latest instance of the first cloud application;
in response to identifying that the compliance measurement action is not executed for the first instance of the first cloud application, determining metadata for starting a new instance of the first cloud application based on evaluating the current metadata and the latest metadata according to evaluation rules including rules associated with technical and compatibility requirements of the first cloud application;
starting the new instance of the first cloud application; and
deprecating and stopping the first instance of the first cloud application.

4. The method of claim 1, further comprising:
auditing, by at least some of the plurality of compliance monitors, a plurality of instances of cloud applications on the cloud platform based on corresponding configured rules defined for the cloud applications;
in response to the auditing,
creating, by a first compliance monitor of the plurality of compliance monitors, a first compliance request associated with a first incompliance identified at the first instance of the first cloud application, wherein the first compliance monitor is responsible for identifying the first type of incompliances at the cloud applications, wherein the first compliance request includes a first time period defined for awaiting of execution of compliance measurements to remedy the first incompliance; and
creating, by a second compliance monitor of the plurality of compliance monitors, a second compliance request associated with a second incompliance identified at the first instance of the first cloud application, wherein the second compliance monitor is responsible for identifying a second type of incompliances at the cloud applications, wherein the second compliance request includes a second time period defined for awaiting of execution of compliance measurements to remedy the second incompliance;

storing, by the first compliance monitor and the second compliance monitor, the first compliance request and the second compliance request at a persistence storage; and in response to creating and storing the first and the second compliance requests, generating a first notification for the first instance of the first cloud application and a second notification for the first instance of the first cloud application, wherein the first notification is to be sent over a first communication channel of a plurality of communication channels to a contact entity defined for the first instance of the first cloud application, wherein the second notification is to be sent over the first communication channel of a plurality of communication channels to the contact entity defined for the first instance of the first cloud application.

5. The method of claim 4, wherein each compliance monitor of the plurality of compliance monitors is responsible for identifying a different type of incompliance of a cloud application, wherein one instance of a cloud application is associated with one or more different types of incompliance.

6. The method of claim 4, wherein the plurality of communication channels include e-mail communication, instant messaging, voice message communication, direct phone communication, and application-to-application communication.

7. The method of claim 1, wherein each compliance monitor of the plurality of compliance monitors maintains rules for evaluating status of instances of cloud applications running on the cloud platform, wherein rules maintained by each compliance monitor correspond to each type of incompliance for which the compliance monitor is responsible.

8. The method of claim 4, wherein auditing the plurality of instances of cloud applications further comprises:
performing compliance verification by evaluating runtime configurations of runtime environments where instances of an application is running, wherein the compliance verification comprises:
performing security checks associated with an instance of an application; and
identifying a security incompliance associated with a runtime environment for executing the instance of the application.

9. The method of claim 4, wherein the first notification includes data describing the first incompliance identified at the first instance of the first cloud application.

10. The method of claim 4, further comprising:
providing the first notification and the second notification to the contact entity defined for the first instance by a notification component of a plurality of notification components, wherein the notification component corresponds to the first communication channel.

11. The method of claim 4, wherein the first notification is provided to one or more entities defined for the first instance of the first cloud application by a corresponding one or more notification components, wherein a notification component corresponds to a type of communication channel, and wherein one notification component handles generation and providing of notifications associated with multiple instances associated with one or more cloud applications running on the cloud platform.

12. A non-transitory, computer-readable medium coupled to one or more processors and having instructions stored thereon which, when executed by the one or more processors, cause the one or more processors to perform operations, the operations comprising:

in response to generating compliance requests for one or more incompliant instances of one or more cloud applications, automatically executing compliance checks for the one or more incompliant instances of cloud applications running on a cloud platform, wherein the one or more incompliant instances are associated with one or more incompliances identified at the one or more incompliant instances, wherein the incompliances are identified by different compliance monitors from a plurality of compliance monitors instantiated at the cloud platform, and wherein each compliance monitor is responsible for a particular type of incompliances;

in response to identifying that a first instance of a first cloud application has a first type of incompliance after executing a corresponding compliance check, scheduling a maintenance action to be automatically executed by a first compliance maintainer running on the cloud platform, wherein the first compliance maintainer is configured to execute compliance measurement actions for the first type of incompliance identified at the first instance of the first cloud application; and automatically executing, by the first compliance maintainer, the maintenance action at the first instance of the first cloud application.

13. The computer-readable medium of claim 12, wherein an incompliance that is associated with the first instance of the first cloud application is an incompliance of a runtime environment used for executing the first instance of the first cloud application, wherein the runtime environment used for executing the first instance differs from one or more compliant versions of a runtime environment that is to be used by cloud applications running on the cloud platform.

14. The computer-readable medium of claim 12, further comprising instructions which, when executed by the one or more processors, cause the one or more processors to perform operations, the operations comprising:

retrieving current metadata for the first instance of the first cloud application from the first instance of the first cloud application;

retrieving latest metadata for the first cloud application, wherein the latest metadata includes latest deployment configuration data used for deploying a latest instance of the first cloud application;

in response to identifying that the compliance measurement action is not executed for the first instance of the first cloud application, determining metadata for starting a new instance of the first cloud application based on evaluating the current metadata and the latest metadata according to evaluation rules including rules associated with technical and compatibility requirements of the first cloud application;

starting the new instance of the first cloud application; and deprecating and stopping the first instance of the first cloud application.

15. The computer-readable medium of claim 12, further comprising instructions which, when executed by the one or more processors, cause the one or more processors to perform operations, the operations comprising:

auditing, by at least some of the plurality of compliance monitors, a plurality of instances of cloud applications on the cloud platform based on corresponding configured rules defined for the cloud applications;

in response to the auditing, creating, by a first compliance monitor of the plurality of compliance monitors, a first compliance request associated with a first incompliance identified at the first instance of the first cloud application, wherein the first compliance monitor is responsible for identifying the first type of incompliances at the cloud applications, wherein the first compliance request includes a first time period defined for awaiting of execution of compliance measurements to remedy the first incompliance; and creating, by a second compliance monitor of the plurality of compliance monitors, a second compliance request associated with a second incompliance identified at the first instance of the first cloud application, wherein the second compliance monitor is responsible for identifying a second type of incompliances at the cloud applications, wherein the second compliance request includes a second time period defined for awaiting of execution of compliance measurements to remedy the second incompliance;

storing, by the first compliance monitor and the second compliance monitor, the first compliance request and the second compliance request at a persistence storage; and in response to creating and storing the first and the second compliance requests, generating a first notification for the first instance of the first cloud application and a second notification for the first instance of the first cloud application, wherein the first notification is to be sent over a first communication channel of a plurality of communication channels to a contact entity defined for the first instance of the first cloud application, wherein the second notification is to be sent over the first communication channel of a plurality of communication channels to the contact entity defined for the first instance of the first cloud application.

16. The computer-readable medium of claim 15, wherein each compliance monitor of the plurality of compliance monitors is responsible for identifying a different type of incompliance of a cloud application, wherein one instance of a cloud application is associated with one or more different types of incompliance, wherein the plurality of communication channels include e-mail communication, instant messaging, voice message communication, direct phone communication, and application-to-application communication, wherein each compliance monitor of the plurality of compliance monitors maintains rules for evaluating status of instances of cloud applications running on the cloud platform, and wherein rules maintained by each compliance monitor correspond to each type of incompliance for which the compliance monitor is responsible.

17. The computer-readable medium of claim 15, wherein auditing the plurality of instances of cloud applications further comprises:

performing compliance verification by evaluating runtime configurations of runtime environments where instances of an application is running, wherein the compliance verification comprises:

performing security checks associated with an instance of an application; and identifying a security incompliance associated with a runtime environment for executing the instance of the application, wherein the computer-readable medium further comprises instructions which, when executed by the one or more processors, cause the one or more processors to perform operations, the operations comprising:
providing the first notification and the second notification to the contact entity defined for the first instance by a notification component of a plurality of notification components, wherein the notification component corresponds to the first communication channel, wherein the first notification is provided to one or more entities defined for the first instance of the first cloud application by a corresponding one or more notification components, wherein a notification component corresponds to a type of communication channel, and wherein one notification component handles generation and providing of notifications associated with multiple instances associated with one or more cloud applications running on the cloud platform.

18. A system comprising
a computing device; and
a computer-readable storage device coupled to the computing device and having instructions stored thereon which, when executed by the computing device, cause the computing device to perform operations, the operations comprising:
in response to generating compliance requests for one or more incompliant instances of one or more cloud applications, automatically executing compliance checks for the one or more incompliant instances of cloud applications running on a cloud platform, wherein the one or more incompliant instances are associated with one or more incompliances identified at the one or more incompliant instances, wherein the incompliances are identified by different compliance monitors from a plurality of compliance monitors instantiated at the cloud platform, and wherein each compliance monitor is responsible for a particular type of incompliances;
in response to identifying that a first instance of a first cloud application has a first type of incompliance after executing a corresponding compliance check, scheduling a maintenance action to be automatically executed by a first compliance maintainer running on the cloud platform, wherein the first compliance maintainer is configured to execute compliance measurement actions for the first type of incompliance identified at the first instance of the first cloud application; and
automatically executing, by the first compliance maintainer, the maintenance action at the first instance of the first cloud application.

19. The system of claim 18, wherein an incompliance that is associated with the first instance of the first cloud application is an incompliance of a runtime environment used for executing the first instance of the first cloud application, wherein the runtime environment used for executing the first instance differs from one or more compliant versions of a runtime environment that is to be used by cloud applications running on the cloud platform.

20. The system of claim 18, wherein the computer-readable storage device further comprises instructions stored thereon which, when executed by the computing device, cause the computing device to perform operations, the operations comprising:
retrieving current metadata for the first instance of the first cloud application from the first instance of the first cloud application;
retrieving latest metadata for the first cloud application, wherein the latest metadata includes latest deployment configuration data used for deploying a latest instance of the first cloud application;
in response to identifying that the compliance measurement action is not executed for the first instance of the first cloud application, determining metadata for starting a new instance of the first cloud application based on evaluating the current metadata and the latest metadata according to evaluation rules including rules associated with technical and compatibility requirements of the first cloud application;
starting the new instance of the first cloud application; and
deprecating and stopping the first instance of the first cloud application.

* * * * *